(12) United States Patent
Hambrick et al.

(10) Patent No.: US 7,617,479 B2
(45) Date of Patent: Nov. 10, 2009

(54) METHOD AND APPARATUS FOR GENERATING SERVICE FRAMEWORKS

(75) Inventors: Geoffrey Martin Hambrick, Round Rock, TX (US); Ryuta Hasumi, Tokyo (JP); Kenichi Horiuchi, Tokyo (JP); Hiroyuki Tarusawa, Tokyo (JP); Seiki Yaegashi, Tama (JP)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 11/168,789

(22) Filed: Jun. 28, 2005

(65) Prior Publication Data

US 2006/0294526 A1 Dec. 28, 2006

(51) Int. Cl.
*G06F 9/44* (2006.01)
*G06F 3/00* (2006.01)

(52) U.S. Cl. .................. 717/104; 717/106; 717/108; 717/127; 717/166; 719/316; 719/330

(58) Field of Classification Search ......... 717/104–113, 717/114, 120–123, 174, 116, 115, 100, 127, 717/166; 707/103; 714/48–57; 709/214–226; 719/316, 330
See application file for complete search history.

(56) References Cited

U.S. PATENT DOCUMENTS

| | | | | |
|---|---|---|---|---|
| 6,072,492 A * | 6/2000 | Schagen et al. | | 715/733 |
| 6,415,434 B1 * | 7/2002 | Kind | | 717/107 |
| 2002/0023261 A1 * | 2/2002 | Goodwin et al. | | 717/146 |
| 2002/0059404 A1 * | 5/2002 | Schaaf et al. | | 709/220 |
| 2003/0023952 A1 * | 1/2003 | Harmon, Jr. | | 717/106 |
| 2004/0068560 A1 * | 4/2004 | Oulu et al. | | 709/224 |
| 2005/0138606 A1 * | 6/2005 | Basu et al. | | 717/136 |
| 2005/0144226 A1 * | 6/2005 | Purewal | | 709/203 |
| 2005/0183062 A1 * | 8/2005 | Ubukata et al. | | 717/104 |
| 2006/0101442 A1 * | 5/2006 | Baumgart et al. | | 717/162 |

OTHER PUBLICATIONS

"Programming With Objects: A Comparative Presentation of Object-Oriented Programming With C++ and Java" by A. C. Kak, 2003, Wiley Interscience, pp. 399-401, 408, 967, 968, 983, 984.*

* cited by examiner

*Primary Examiner*—Lewis A Bullock, Jr.
*Assistant Examiner*—Himanshu Yadav
(74) *Attorney, Agent, or Firm*—Yee & Associates, P.C.; David A. Mims, Jr.

(57) ABSTRACT

A method, an apparatus, and computer instructions for generating service frameworks are provided by aspects of the present invention. One aspect of the present invention provides a system library, which includes strongly typed classes that enterprise applications may use in order to obtain code assist and compile time checking from IDE tools typically used by enterprise application developers. Another aspect of the present invention provides the ability to define platform independent models that enable service use cases in order to determine what basic services are needed by the enterprise application. Yet another aspect of the present invention includes an integrated generator that generates the strongly typed components and skeleton code from the platform independent models by applying best practice pattern usage for the target platform currently used with the system library functions.

35 Claims, 29 Drawing Sheets

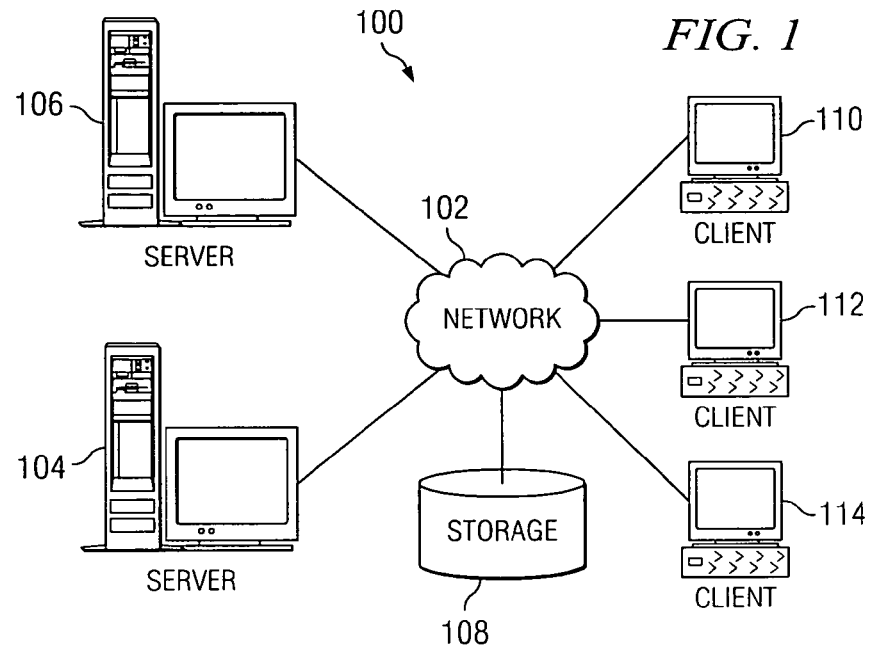

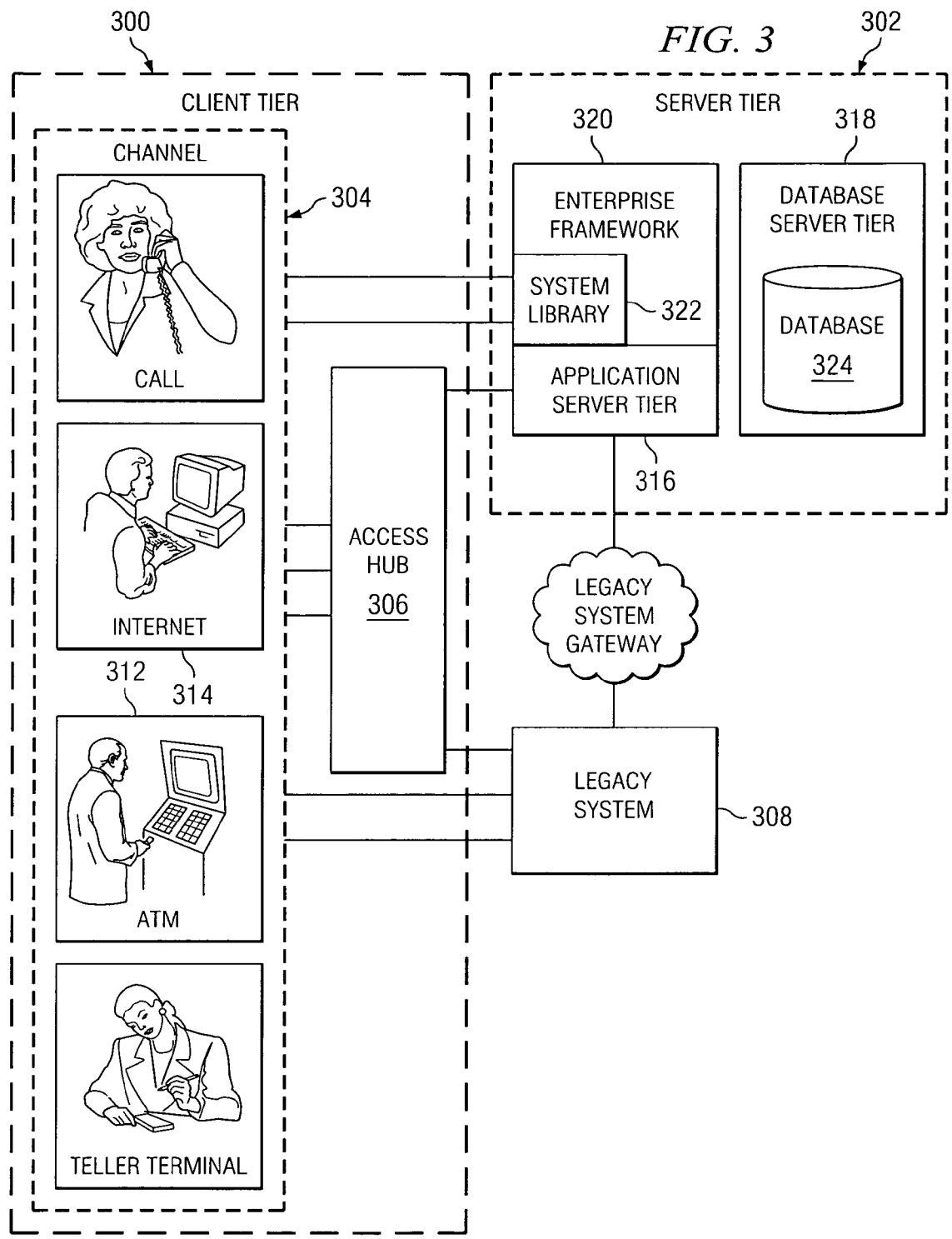

FIG. 5

```xml
<?xml version="1.0" encoding="UTF-8"?>
<!--
    * NEFSS Source Materials.
    * (C) Copyright IBM Corp. 2005. All Rights Reserved.
-->
<app
    ejbProjectName="AtmProject"
    xmlns="http://www.ibm.com/NEFSS"
    xmlns:xsi="http://www.w3.org/2001/XMLSchema-instance"
    xsi:schemaLocation="http://www.ibm.com/NEFSS GeneratorModelSchema.xsd">
    <service
            name="ATM"                                          /‾502
            package="jp.co.atm"
            extensionType="jp.co.ServiceGroup"
            extensionCategory="handler"
            description=" ">
        <method
                name="withdraw"
                returnType="WithdrawResponse"                   /‾504
                description="">
            <parameter
                    name="request"
                    type="WithdrawRequest"
                    description=" ›"/>
            <exception
                    type="WithdrawException"                    /‾508
                    description=" "/>
            <exception
                    type="OverdrawnException"
                    description=" "/>
            <snippet name="SampleSnippet"
                    source="SampleServiceSnippetSource.xml"/>
506 /‾     <debugTrace
                    name="">
                <parameter
                        name="request"
                        type="WithdrawRequest"
                        description=" ›"/>
            </debugTrace>
            <informationLog
                    name="test"
                    messageID="NFSS00011"/>
        </method>
```

```
</service>
<object
        name="Account"  ⟵ 510
        package="jp.co"
        scope="application"  ⟵ 512
        description="">
    <property
            name="bank"
            type="int"
            description="" />
    <property
            name="branch"
            type="int"
            description="" />
    <property
            name="number"
            type="int"
            description="" />
</object>
```

```
                ⎡  <debugTrace
                ⎢          name="test">
                ⎢      <parameter
           1502 ⎨              name="request"
                ⎢              type="WithdrawRequest"
                ⎢              description=/>
                ⎣  </debugTrace>
                ⎡  <informationLog
                ⎢          name="input"
                ⎢          messageID="NFSS0002I">
           1504 ⎨      <parameter name="request"
                ⎢              type="WithdrawRequest"
                ⎢              description=/>
                ⎣  </informationLog>
```

FIG. 7

```xml
<?xml version="1.0" encoding="UTF-8"?>
<!--
    * NEFSS Source Materials.
    * (C) Copyright IBM Corp. 2005. All Rights Reserved.
-->
<app
    ejbProjectName="SampleProject"
    xmlns="http://www.ibm.com/NEFSS"
    xmlns:xsi="http://www.w3.org/2001/XMLSchema-instance"
    xsi:schemaLocation="http://www.ibm.com/NEFSS GeneratorModelSchema.xsd">

<object
        name="It051"
        package="jp.co.bank.nefss.serverproperty.It051"
        needPropertyFile="true"
        scope="server"
        description="">
        <property
            name="UniqueKey"
            type="String"
            propertyValue="UniqueKey"
            defaultValue="KEYVALUE"
            description="" />
        <property
            name="UniqueValue"
            type="long"
            propertyValue="100"
            description="" />
        <property
            name="UniqueFlag"
            type="boolean"
            propertyValue="true"
            description="" />
        <property
            name="UniqueDate"
            type="java.util.Date"
            propertyValue="20050101000000999"
            defaultValue="20041101000000999"
            description="" />

</object>

</app>
```

```
<?xml version="1.0" encoding="UTF-8"?>
<!--
    * NEFSS Source Materials.
    * (C) Copyright IBM Corp. 2005. All Rights Reserved.
-->
<app
    ejbProjectName="SampleProject"
    xmlns="http://www.ibm.com/NEFSS"
    xmlns:xsi="http://www.w3.org/2001/XMLSchema-instance"
    xsi:schemaLocation="http://www.ibm.com/NEFSS GeneratorModelSchema.xsd">

<object
        name="AtmRequestContext"                        ~904
        package="jp.co.atm"
        scope="request">    ~902
        <property
            name="CustomerNo"    ~906
            type="int"
            defaultValue="0"
            description="Customer Number" />
        <property
            name="StartDate"    ~908
            type="java.util.Date"
            description="Process Start Time" />
    </object>

</app>
```

FIG. 11

```xml
<?xml version="1.0" encoding="UTF-8"?>
<!--
    * NEFSS Source Materials.
    * (C) Copyright IBM Corp. 2005. All Rights Reserved.
-->
<app
      ejbProjectName="SampleProject"
      separatingEntityProject="false"
      xmlns="http://www.ibm.com/NEFSS"
      xmlns:xsi="http://www.w3.org/2001/XMLSchema-instance"
      xsi:schemaLocation="http://www.ibm.com/NEFSS GeneratorModelSchema.xsd">

<object
            name="Branch"
            description=""
            scope="cell"
            cardinality="many"
            synchronizing="true"
            package="jp.co.bank.nefss.sample">
            <resource
                  type="ENTITY"
            />
            <property
                  name="branchId"
                  type="int"
                  key="primary"
                  description="" />
            <property
                  name="areaId"
                  type="int"
                  key="searchable"
                  description="" />
            <property
                  name="branchName"
                  type="String"
                  length="32"
                  description="" />
      </object>

</app>
```

```xml
<?xml version="1.0" encoding="UTF-8"?>
<!--
    * NEFSS Source Materials.
    * (C) Copyright IBM Corp. 2005. All Rights Reserved.
-->
<app
    ejbProjectName="SampleProject"
    xmlns="http://www.ibm.com/NEFSS"
    xmlns:xsi="http://www.w3.org/2001/XMLSchema-instance"
    xsi:schemaLocation="http://www.ibm.com/NEFSS GeneratorModelSchema.xsd">

<access
        type="jndi"
        name="ConnectionFactory"
        package="jp.co.banka.eis"
        implClass="javax.resource.cci.ConnectionFactory"
        cacheable="false">
    </access>

</app>
```

- 1300: (entire listing)
- 1302: <access>...</access> block
- 1304: type="jndi"
- 1306: name="ConnectionFactory"
- 1308: implClass="javax.resource.cci.ConnectionFactory"

FIG. 17

```xml
<performanceStatistics>
    <time
        name="Begin"
        index="0"
        level="high"
        description=""/>
    <count
        name="Process"
        index="0"
        level="middle"
        description=""/>
    <text
        name="Result"
        index="0"
        level="low"
        description=""/>
</performanceStatistics>
```

- 1700: (entire listing)
- 1702: <performanceStatistics>...</performanceStatistics>
- 1704: <time .../>
- 1706: <count .../>
- 1708: <text .../>

FIG. 19

```xml
<?xml version="1.0" encoding="UTF-8"?>
<!--
    * NEFSS Source Materials.
    * (C) Copyright IBM Corp. 2005. All Rights Reserved.
-->
<app ejbProjectName="SampleProject" xmlns="http://www.ibm.com/NEFSS"
xmlns:xsi="http://www.w3.org/2001/XMLSchema-instance"
xsi:schemaLocation="http://www.ibm.com/NEFSS GeneratorModelSchema.xsd">
        1902
        <command name="BankAdmin" package="jp.co.banka.admin">
            <domain name="BANKA/Admin" />
    1904
            <mbean name="BankAdmin" type="Administration"
facadeExecutionMode="sequential" mbeanExecutionMode="synchronous">
        1906   <operation name="setBankingDate" return="void">
                    <parameter name="date" type="java.util.Date" />
                </operation>                    1908
                <operation name="putAllAttributes" return="void"
facadeExecutionMode="simultaneous" mbeanExecutionMode="asynchronous" />
            </mbean>

1910   <commandLine>
                <operation name="set_banking_date"
relatedMBeanOperation="setBankingDate">             1912
                    <parameter name="date">
                        <exclusive>
                            <value type="literal" format="TODAY" />
                            <value type="date" format="yyyyMMdd" />
                        </exclusive>
                    </parameter>
                </operation>
                <operation name="put_all_attr"
relatedMBeanOperation="putAllAttributes" />         1914
            </commandLine>
        </command>

</app>
```

```xml
<?xml version="1.0" encoding="UTF-8"?>
<!--
    * NEFSS Source Materials.
    * (C) Copyright IBM Corp. 2005. All Rights Reserved.
-->
<app
        ejbProjectName="SampleProject"
        xmlns="http://www.ibm.com/NEFSS"
        xmlns:xsi="http://www.w3.org/2001/XMLSchema-instance"
        xsi:schemaLocation="http://www.ibm.com/NEFSS GeneratorModelSchema.xsd">

<object
                name="Atm"
                package="jp.co.atm"
                scope="startup">                    ~ 2102

<initialMethod>
                                <initialParameter name="WithDraw01">
                                        <property
                                                name="id"
                                                type="int"
                                                description="Initial parameter for Atm" />
                                </initialParameter>
                        </initialMethod>

<terminalMethod>
                                <terminalParameter name="WithDraw02">
                                        <property
                                                name="code"
                                                type="String"
                                                description="Terminal parameter for Atm" />
                                </terminalParameter>
                        </terminalMethod>

</object>

</app>
```

2100

2104 — initialMethod block

2106 — terminalMethod block

```xml
<?xml version="1.0" encoding="UTF-8"?>
<!--
    * NEFSS Source Materials.
    * (C) Copyright IBM Corp. 2005. All Rights Reserved.
-->
<app
    ejbProjectName="SampleProject"
    xmlns="http://www.ibm.com/NEFSS"
    xmlns:xsi="http://www.w3.org/2001/XMLSchema-instance"
    xsi:schemaLocation="http://www.ibm.com/NEFSS GeneratorModelSchema.xsd">

<object
        name="SampleException"        ← 2304
        package="jp.tokyo"
        scope="exception"             ← 2302
        runtime="false"
        messageID="SAMPLE01E"         ← 2306
        description="sample exception.">
        <property                     ← 2308
            name="longValue"
            type="long"/>
    </object>

</app>
```

FIG. 26A

```
<schema
    *=======================================*
    * service
    *=======================================*
-->
<complexType name="serviceType">                    — 2602
    <choice
            maxOccurs="unbounded">
        <element
                name="method"       — 2604
                type="nefss:serviceMethodType"/> <!-- required:BDAF,LT,TM -->
        <element
                minOccurs="0"
                maxOccurs="0"
                name="command"  — 2606
                type="nefss:serviceCommandType"/> <!-- required:SC,LT4SC,TM4SC -->
    </choice>
</complexType>
<complexType name="serviceMethodType">              — 2608
    <sequence maxOccurs="unbounded">
        <element
                name="parameter"
2610            type="nefss:serviceParameterType"
                minOccurs="0"
                maxOccurs="unbounded"/> <!-- optional:BDAF,LT -->
        <element
                name="exception"
2612            type="nefss:serviceExceptionType"
                minOccurs="0"
                maxOccurs="unbounded"/> <!-- optional:BDAF,LT -->
        <element
                name="informationLog"
2614            type="nefss:informationLogType"
                minOccurs="0"
                maxOccurs="unbounded"/> <!-- optional:LT(Log) -->
        <element
                name="debugTrace"
2616            type="nefss:debugTraceType"
                minOccurs="0"
                maxOccurs="unbounded"/> <!-- optional:LT(Trace) -->
        <element
                name="snippet"
2618            type="nefss:snippetType"
                minOccurs="0"
                maxOccurs="1"/> <!-- optional:BDAF -->
        <element
                name="performanceStatistics"
2620            type="nefss:performanceStatisticsType"
                minOccurs="0"
                maxOccurs="1"/> <!-- required:TM -->
    </sequence>
</complexType>
```

```
                                    2622                                      2600
<complexType name="serviceCommandType"> <!-- required:SC -->
    <sequence maxOccurs="unbounded">
        <element name="input"
            minOccurs="0"> <!-- optional:SC -->
2624        <complexType>
                <attributeGroup ref="nefss:serviceCommandDataAttributes"/>
            </complexType>
        </element>
        <element name="output"
            minOccurs="0"> <!-- optional:SC -->
2626        <complexType>
                <attributeGroup ref="nefss:serviceCommandDataAttributes"/>
            </complexType>
        </element>
        <element
            name="exception"
2628        type="nefss:serviceExceptionType"
            minOccurs="0"/> <!-- optional:SC -->
        <element
            name="plugin"
            minOccurs="0"> <!-- optional:SC -->
            <complexType>
2630            <attribute
                    name="name"
                    type="string"
                    use="required"/>
            </complexType>
        </element>
```

2632 {
```
<element
    name="exceptionHandler"
    minOccurs="0"> <!-- optional:SC -->
    <complexType>
        <attribute
            name="name"
            type="string"
            use="required" />
    </complexType>
</element>
```

2634 {
```
<element
    name="informationLog"
    type="nefss:informationLogType"
    minOccurs="0"
    maxOccurs="unbounded" /> <!-- optional:LT4SC(Log) -->
```

2636 {
```
<element
    name="debugTrace"
    type="nefss:debugTraceType"
    minOccurs="0"
    maxOccurs="unbounded" /> <!-- optional:LT4SC(Trace) -->
```

2638 {
```
<element
    name="snippet"
    type="nefss:snippetType"
    minOccurs="0"
    maxOccurs="1" /> <!-- optional:SC -->
```

2640 {
```
<element
    name="performanceStatistics"
    type="nefss:performanceStatisticsType"
    minOccurs="0"
    maxOccurs="1" /> <!-- required:TM4SC -->
```

```
        </sequence>
</complexType>
```

```
<!--
*=========================================*
* command
*=========================================*
-->
    <complexType name="commandType">  /— 2642
        <sequence>
                                 2644
            <element name="mbean"><!-- required:CM -->
                <complexType>
                    <sequence>           2646
                        <element        /
                            name="operation"
</complexType>           2648
        </element>        /
        <element name="exception" minOccurs="0"
            maxOccurs="unbounded"><!-- optional:CM -->
                                2650
        </element>       /~
        <element name="commandLine"><!-- required:CM -->
            <complexType>
                <sequence>
                    <element
                        name="operation"
                        minOccurs="1"
                        maxOccurs="unbounded"><!-- required:CM
                    </element>
                </sequence>
                <attribute
                    name="validatorClassName"
                    type="string" /><!-- optional:CM -->
                <attribute
                    name="validatorInitialParameter"
                    type="string" /><!-- optional:CM -->
            </complexType>

</element>
    </sequence>
    </complexType>
</schema>
```

FIG. 26D

```
<!--
*==========================================*
* object
*==========================================*
-->
<complexType name="objectType">  ⟋2652
    <sequence>

<attribute
  2653⟋ name="scope"> <!-- required:AC,ST,EX,SP,RC,AL optional:PE-->
        <simpleType>
            <restriction base="string">
                2654⟋ <enumeration value="cell"/> <!-- ST -->
                       <enumeration value="server"/> <!-- SP --> ⟋2656
                2658⟋ <enumeration value="request"/> <!-- RC -->
                       <enumeration value="application"/> <!-- AC --> ⟋2660
                       <enumeration value="pluginextension"/> <!-- PE -->
                       <enumeration value="exception"/> <!-- EX --> ⟍2664
                2666⟋ <enumeration value="startup"/> <!-- SS -->
                       <enumeration value="applicationlog"/> <!-- AL --> ⟍2668
            </restriction>
        </simpleType>
    </attribute>
</complexType>
```

```
<!--
    *=================================*
    * access
    *=================================*
-->
<complexType name="accessType">  /— 2670
    <simpleContent>
        <extension base="string">
            <attribute
                name="name"
                type="string"
                use="required" /> <!-- required:AM -->
            <attribute
                name="type"
                use="required"> <!-- required:AM -->
                <simpleType>
                    <restriction base="string">
                        <enumeration value="jndi" />
                    </restriction>
                </simpleType>
            </attribute>
            <attribute
                name="package"
                type="string"
                use="required" /> <!-- required:AM -->
            <attribute name="implClass" use="required"> <!-- required:AM -->
                <simpleType>
                    <union>
                        <simpleType>
                            <restriction base="nefss:fullyQualifiedName" />
                        </simpleType>
                    </union>
                </simpleType>
            </attribute>
            <attribute
                name="cacheable"
                type="nefss:boolean" /> <!-- optional:AM -->
            <attribute
                name="description"
                type="string" /> <!-- optional:AM -->
        </extension>
    </simpleContent>
</complexType>
```

2600

2672

2674

METHOD AND APPARATUS FOR GENERATING SERVICE FRAMEWORKS

BACKGROUND OF THE INVENTION

1. Field of the Invention

The present invention relates generally to a data processing system. In particular, the present invention relates to service frameworks in a data processing system. Still more particularly, the present invention relates to generating service frameworks in a data processing system.

2. Description of the Related Art

Enterprise applications are becoming increasingly popular as more business and transactions are done electronically over the Internet and other networks. Enterprise software is typically any software suite with common business applications that provides tools for modeling how the entire organization works and development tools for building tools unique to the organization. A framework is a defined structure in which another software project can be organized and developed effectively allowing the different components of an application to be integrated. A service framework is a software framework developed to provide a core set of functions needed by a service industry. For example, a banking service framework may be developed to provide a core set of functions for the banking industry, including automatic teller machine (ATM) functions, account management functions, and Internet access functions.

On the other hand, enterprise frameworks such as Java 2 Enterprise Edition (J2EE) were developed to simplify application development as much as possible. J2EE is a product available from Sun Microsystems, Inc. J2EE is a Java-based runtime platform for developing, deploying, and managing distributed multi-tier architectural applications using modular components. J2EE is particularly useful for database management, banking and transactional services, and electronic ticketing to name a few applications. J2EE is a strongly typed interface architecture, which means that datatypes of enterprise applications can be type-checked at compile time so that type errors can be minimized at run time. For example, a strongly typed method getcustomer( ) may be type-checked at compile time to determine whether a Customer object is returned.

With the strongly typed interface architecture of J2EE, a programmer working in an integrated development environment (IDE) is assisted in creating the code and catching more errors during compile time which results in savings of time and effort. Further, custom coded components make it easier to debug errors that occur at runtime because there is less need to look inside the value of variables (usually requiring a "dump" or a step by step trace). Despite these benefits, it is still very difficult to code enterprise applications following the best practice usage of the J2EE framework components because any large application ultimately needs a large number of custom coded components. The problem is that applications with a large number of components are harder to maintain. These applications take up additional time to build and extra memory at runtime.

To minimize the number of components that must be developed, many development organizations invent their own framework on top of J2EE. These extensions or plug-in modules often allow the functionality of the framework to be expanded providing features and functions not yet supported. Common extensions include those that provide additional output requests and resources. However, extensions are not always useful. Sometimes these extensions inadvertently "undo" the benefits of strong typing by providing weakly typed objects for the average programmer to use. Weakly typed objects are objects that may be easily typed as other objects. For example, Java 'Object' class or 'String' class are weakly typed objects.

Even with these extensions, the enterprise application is error prone and the performance may suffer from having extra layers that effectively "do nothing". In the end, the development team is faced with an uncomfortable choice—maintainability or performance. Therefore, it would be advantageous to have a method that leverages a strongly typed architecture framework, such as J2EE, to generate service framework components, such that both usability and performance may be achieved.

SUMARY OF THE INVENTION

A method, an apparatus, and computer instructions in a data processing system are provided for generating service frameworks. Aspects of the present invention provide a system library comprising a set of components that includes object components and service components for a service framework. Aspects of the present invention also identify a subset of components from the set of components based on a set of platform independent models and generate a set of code components for the service framework using the subset of components. The set of platform independent models is defined by a user using a set of application definitions.

The object components are fully generated by an integrated generator and the service components are edited by a user to implement service functions.

Aspects of the present invention also identify a different subset of components for the service framework based on a different platform independent model in the set of platform independent models and generate the set of code components based on a best practice pattern usage for a target platform of the service framework.

One aspect of present invention generates the set of code components by generating an access class in the object components to retrieve a business delegate responsive to detecting a definition of a service in an application definition, generating the business delegate in the object components, wherein the business delegate is used by a client to invoke a service method of a service represented by one of the service components, generating an application façade in the object components to handle server side before and after logic as defined in the application definition, and generating an application context for storing parameters and return values for business transactions between the client and the service, responsive to detecting an object definition comprising a scope of application. The before and after logic include checking for service availability, retrieving a transaction identifier, starting a trace, and handling exceptions.

Another aspect of present invention generates the set of code components by generating an access class in the object components to retrieve a manager class responsive to detecting an object definition comprising a scope of server in an application definition, generating the manager class in the object components to retrieve server properties from a data class, and generating the data class in the object components to read server properties from a property file and cache the server properties at a server start up, wherein the data class includes get methods for accessing property values of the server properties, and wherein the data class includes a reload method to reload server properties from the property file if the property file is updated without a server restart.

Another aspect of present invention generates the set of code components by generating an access class in the object components to retrieve a manager class responsive to detecting an object definition comprising a scope of request in an application definition, generating the manager class in the object components to retrieve shared data from a data class, wherein the manager class retrieves the shared data from a work area if the shared data is absent in the data class, and wherein the shared data is transient data shared between the business delegate and the application façade, and generating the data class in the object components to cache the shared data and hold transaction statistics data.

Another aspect of present invention generates the set of code components by generating an access class in the object components to retrieve a manager class responsive to detecting an object definition comprising a scope of cell in an application definition, generating the manager class in the object components to retrieve persistent shared data from a data class, generating a container managed persistent bean in the object components to retrieve the persistent shared data from a shared table in a database via a shared table instance, and generating the data class in the object components to cache the retrieved persistent shared data, wherein the manager class reloads the persistent shared data from the shared table in the database to update the data class responsive to an update of the persistent shared data by an operator.

Another aspect of present invention generates the set of code components by generating an access class in the object components to handle client side before and after logic, format a message from client parameters, send the message to a servlet class, received a message from the servlet class, and unformat the message responsive to detecting an object definition comprising an access element in an application definition, generating a servlet class in the object components to demarshal the message into server parameters, invoke a service method on a local stateless session bean, marshal a message from server parameters, and send the marshaled message to the access class, and generating the local stateless session bean to handle server side before and after logic, invoke the service method on a service, and return a result to the servlet class.

Another aspect of present invention generates the set of code components by generating an access class in the object components to retrieve a business delegate responsive to detecting an object definition comprising a scope of exception in an application definition, generating the business delegate in the object components, wherein the business delegate is used by a client to invoke a service method of a service represented by one of the service components, generating a log class to log an exception when the exception is thrown by the service method, and returning the exception to a client, wherein the access class retries calling the service method when the exception is thrown by the service method.

Furthermore, the aspects of the present invention generate a command script to dispatch commands to a plurality of server instances, responsive to detecting an object definition comprising a performance statistics element in an application definition, dispatch the commands to the plurality of server instances, responsive to detecting a request for a list of server properties, collect results from the plurality of server instances, and aggregate the results and returning to the operator.

Moreover, the aspects of the present invention generate a command client to invoke a command received from a command script and delegate the command to a command façade responsive to detecting an object definition comprising a command element in an application definition, and generate the command façade to invoke an mbean on each server to retrieve server properties of each server and return status of each command from each server to the command client.

In addition, the aspects of the present invention generate a startup bean to invoke an initialize method to launch each component in the set of code components in order, and invoke a terminal method to shutdown each component in order responsive to detecting an object definition comprising a scope of startup in an application definition.

Yet another aspect of present invention generates the set of code components by generating an access class in the object components to retrieve a business delegate responsive to detecting a definition of a scope of exception in an application definition, generating the business delegate in the object components, wherein the business delegate is used by a client to invoke a service method of a service represented by one of the service component, and generating an application façade in the object components to handle server side before and after logic as defined in the application definition, wherein the access class retries to invoke a service method when an exception is thrown by the service method and returns an unchecked exception to a client. The client provides user code to pack the unchecked exception in a checked exception, throw the checked exception to the service, unpack the unchecked exception from the checked exception, throw the unchecked exception to the application façade, and catch the unchecked exception via the application façade and the business delegate.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a pictorial representation of a network of data processing systems in which aspects of the present invention may be implemented;

FIG. 2 depicts a block diagram of a data processing system in which aspects of the present invention may be implemented;

FIG. 3 depicts a diagram illustrating a runtime architecture for generating service frameworks in accordance with an illustrative embodiment of the present invention;

FIG. 5 depicts an exemplary application definition file for defining a service in accordance with an illustrative embodiment of the present invention;

FIG. 7 depicts an exemplary application definition file for defining a server property in accordance with an illustrative embodiment of the present invention;

FIG. 9 depicts an exemplary application definition file for defining a request context in accordance with an illustrative embodiment of the present invention;

FIG. 11 depicts an exemplary application definition file for defining a shared table in accordance with an illustrative embodiment of the present invention.

FIG. 13 depicts an exemplary application definition file for defining an access manager in accordance with an illustrative embodiment of the present invention.

FIG. 15 depicts an exemplary application definition file for defining a logging/trace component in accordance with an illustrative embodiment of the present invention;

FIG. 17 depicts an exemplary application definition file for defining a transaction monitor in accordance with an illustrative embodiment of the present invention;

FIG. 19 depicts an exemplary application definition file for defining a command service in accordance with an illustrative embodiment of the present invention;

FIG. 21 depicts an exemplary application definition file for defining a startup bean in accordance with an illustrative embodiment of the present invention;

FIG. 23 depicts an exemplary application definition file for defining an exception in accordance with an illustrative embodiment of the present invention;

FIGS. 26A-26E depict an exemplary XML schema for generating a service framework in accordance with an illustrative embodiment of the present invention.

DETAILED DESCRIPTION OF THE PREFERRED EMBODIMENT

Figure 4:
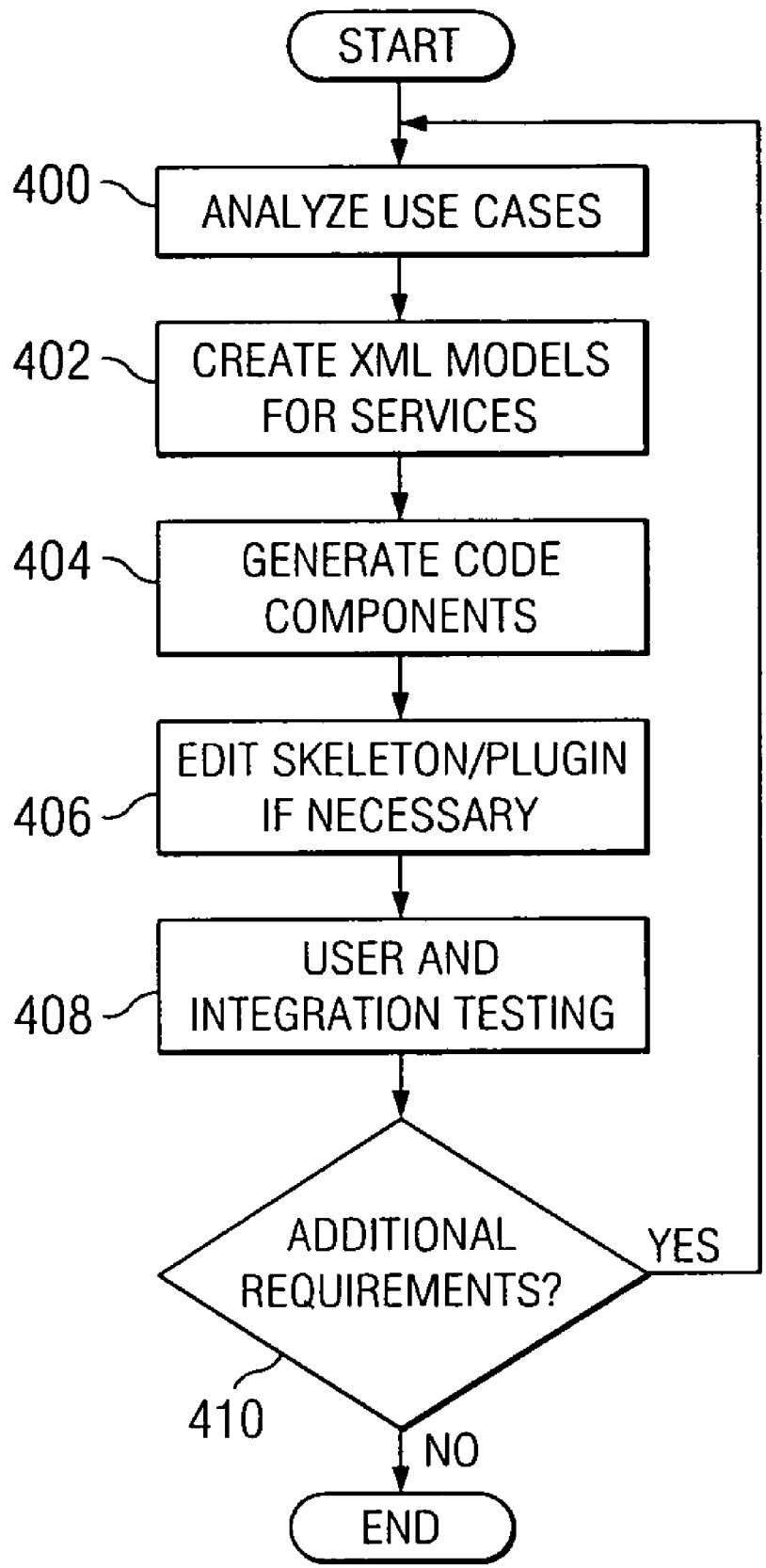
FIG. 4 depicts a flowchart of a high level process for generating service frameworks in accordance with an illustrative embodiment of the present invention.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110, 112, or 114 in FIG. 1, in which computer usable code or instructions implementing the processes for embodiments of the present invention may be located.

In the depicted example, data processing system 200 employs a hub architecture including north bridge and memory controller hub (MCH) 208 and south bridge and input/output (I/O) controller hub (ICH) 210. Processing unit 202, main memory 204, and graphics processor 218 are connected to north bridge and memory controller hub 208. Graphics processor 218 may be connected to north bridge and memory controller hub 208 through an accelerated graphics port (AGP).

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 210 through bus 238. PCI/PCIe devices may include, for example, Ethernet adapters, add-in cards and PC cards for notebook computers. PCI uses a card bus controller, while PCIe does not. ROM 224 may be, for example, a flash binary input/output system (BIOS). Hard disk drive 226 and CD-ROM drive 230 connect to south bridge and I/O controller hub 210 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 210.

An operating system runs on processing unit 202 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 202. Alternatively, a single processor system may be employed.

Instructions for the operating system, the object-oriented programming system, and applications or programs are located on storage devices, such as hard disk drive 226, and may be loaded into main memory 204 for execution by processing unit 202. The processes for embodiments of the present invention are performed by processing unit 202 using computer usable program code, which may be located in a memory such as, for example, main memory 204, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

As some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 204, read only memory 224, or a cache such as found in north bridge and memory controller hub 208 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Aspects of the present invention provide a method, an apparatus, and computer instructions for generating service frameworks. One aspect of the present invention provides a system library that extends the J2EE framework to provide a core set of functions needed by enterprise applications of a service industry, for example, a banking industry. J2EE framework is an exemplary enterprise framework that may be extended by aspects of the present invention. Other platform independent enterprise framework may also be extended by aspects of the present invention without departing from the spirit and scope of the present invention.

The system library provides the ability to generate strongly typed classes that enterprise applications may use in order to obtain code assist and compile time checking from IDE tools typically used by enterprise application developers. This achieves a higher degree of usability for the enterprise applications. However, the number of generated system components also increases.

Therefore, in addition to the system library, another aspect of the present invention provides the ability to define platform independent models that enable service use cases in order to determine what basic services are needed by the enterprise application. Application developers may simply provide the semantics of the services in these platform independent models to generate a pattern of code components. In one aspect of the present invention, these platform independent models may be defined using a markup language format, such as extensible markup language (XML) format.

Yet another aspect of the present invention includes an integrated generator that generates strongly typed components and skeleton code from the platform independent models by applying best practice pattern usage for the target platform currently used with the system library functions. Skeleton code includes plugin classes that may be edited by application developers for a service implementation in order to specify business logic associated with that service. For example, for an ATM service that provides a transfer fund function, a skeleton ATM transfer fund plugin class is generated and may be edited by an application developer to implement the transfer fund function.

In an alternative embodiment, aspects of the present invention provide a method for performing an analysis of financial service parameters to devise a solution meeting the financial service parameters by first receiving the financial service parameters from users. Aspects of the present invention then identify services needed for the particular service framework using the financial service parameters to form a set of identified services. The set of platform independent models are then analyzed using the set of identified services. In turn, a set of components is selected by the integrated generator from a plurality of components for a service framework using the set of identified services and the set of platform independent models. The integrated generator then generates a solution deliverable to a client. The solution may include computer usable program code for the particular service framework using the set of components. The computer usable program code may include object components and service components.

Turning now to FIG. 3, a diagram illustrating a runtime architecture for generating service frameworks is depicted in accordance with an illustrative embodiment of the present invention. As shown in FIG. 3, the runtime architecture for generating service frameworks includes client tier 300 and server tier 302. Client tier 300 includes clients that are associated with different channels 304. Channels are physical connections by which clients in client tier 300 may access server tier 302 and send or receive data to or from server tier 302. Client channels include, for example, a call operator, an ATM, a Website via the Internet, or a teller terminal. Some channels 304 have direct access to server tier 302 or legacy system 308, while other channels 304 have to access server tier 302 or legacy system 308 via access hub 306. For example, ATM clients 312 and Internet clients 314 have to access server tier 302 or legacy system 308 via access hub 306. Access hub 306 integrates channels and consolidates methods to access server tier 302.

Server tier 302 includes application server tier 316 and database server tier 318. Application server tier 316 may be implemented as a data processing system, such as data processing system 200 in FIG. 2. Within application server tier 316, an enterprise framework, such as J2EE framework, may be executed. One example of the J2EE framework is WebSphere Business Integration Foundation V5.1, which is a product available from International Business Machines Corporation. System library 322 that is provided by one aspect of the present invention may be run on enterprise framework 320. On the other hand, database tier 318 includes database 324. An example of database 324 may be DB2 Universal Database V8, which is a product available from International Business Machines Corporation. Thus, with server tier 302, client channels 304 may generate a service framework using a core set of functions provided by system library 322.

Turning now to FIG. 4, a flowchart of a high level process for generating service frameworks is depicted in accordance with an illustrative embodiment of the present invention. As illustrated in FIG. 4, the process begins when enterprise application developers analyze use cases that are applicable to provide services (step 400). For example, a use case of transferring funds may be derived for banking services. After analyzing use cases, enterprise application developers create platform independent models, for example, XML models, to define semantics of the services (step 402). One aspect of the present invention provides a definition for the models in the form of a schema, which defines the structure of the generated components of the service framework. In one example implementation, the XML models are referred to as application definition (appdef) files.

After the platform independent models are defined using the structure defined in the schema, enterprise application developers may generate code components for the service framework using an integrated generator (step 404). The integrated generator generates strongly typed components and skeleton code by applying best practice pattern of usage for the target platform. For example, financial services parameters may be defined in these platform independent models to generate a pattern of code components for the financial service framework. Based on the defined financial services parameters, the integrated generator identifies services that are needed for the financial service framework and analyzes the platform independent models based on the identified services to generate a set of components for the financial service framework. This financial service framework is a solution that is deliverable to a client, which includes computer usage program code comprising object components and service components.

After code components and skeleton code are generated, enterprise application developers may edit the skeleton code or plugin if necessary to implement business logic of the services (step 406). For example, an ATM transfer fund function may be implemented by editing the skeleton. Once the skeleton is edited, user and integration testing may be performed (step 408) and a determination is made by enterprise application developers as to whether additional service requirements are present (step 410). If additional service requirements are present, the process returns to step 400 to further analyze the use cases. Otherwise, the process terminates thereafter.

As described above, one aspect of the present invention provides a system library that extends the J2EE framework to provide a core set of functions needed by enterprise applications of a service industry, for example, a banking industry. In one example implementation, the system library includes eleven components that cover the core functions. These components include business delegate and application façade with application context, server property, request context, shared table, access manager, logging/tracing, transaction monitor, command, startup and shutdown, exception, and integrated generator.

Business delegate and application façade provides a business delegate object that is similar to a client stub and a façade object that is similar to a server skeleton. The delegate object allows the client to apply a delegate of service methods to a service. For example, an ATM delegate object may include a service method of transfer fund, which delegates to the transfer fund method of ATM service. The application context provides a storage area that contains parameters and return values for the business transactions. The application context is used in the communication between the client application and the service. With the delegate object and application façade with application context, clients may call methods of a service, perform common pre and post processes, call a audit log, manage the transaction, perform retries, and handle exceptions.

In order to generate a service framework, enterprise application developers first analyze the use cases and define a service in platform independent models. One aspect of the present invention allows developers to define these models in application definition files. Turning now to FIG. 5, an exemplary application definition file for defining a service is depicted in accordance with an illustrative embodiment of the present invention. As shown in FIG. 5, in application definition file 500, an enterprise application developer defines ATM service 502.

ATM service 502 includes a business methods, known as withdraw 504. In addition, the enterprise application developer defines server side "before" logic to add a quality of service that is transparent to the developers by delegating the business logic to a "helper" object. The logic is generated in each Façade class associated with the server. For example, a "before" logic to start debug trace 506 may be defined. "After" logic may also be defined to handle system exceptions, tracing, and service availability. For example, an "after" logic to catch WithdrawException 508 may be defined. In addition to a service, an enterprise application developer also defines an object name "Account" 510. Account 510 includes a scope of "application" 512, which indicates to the integrated generator that an application context definition is defined.

Figure 6:
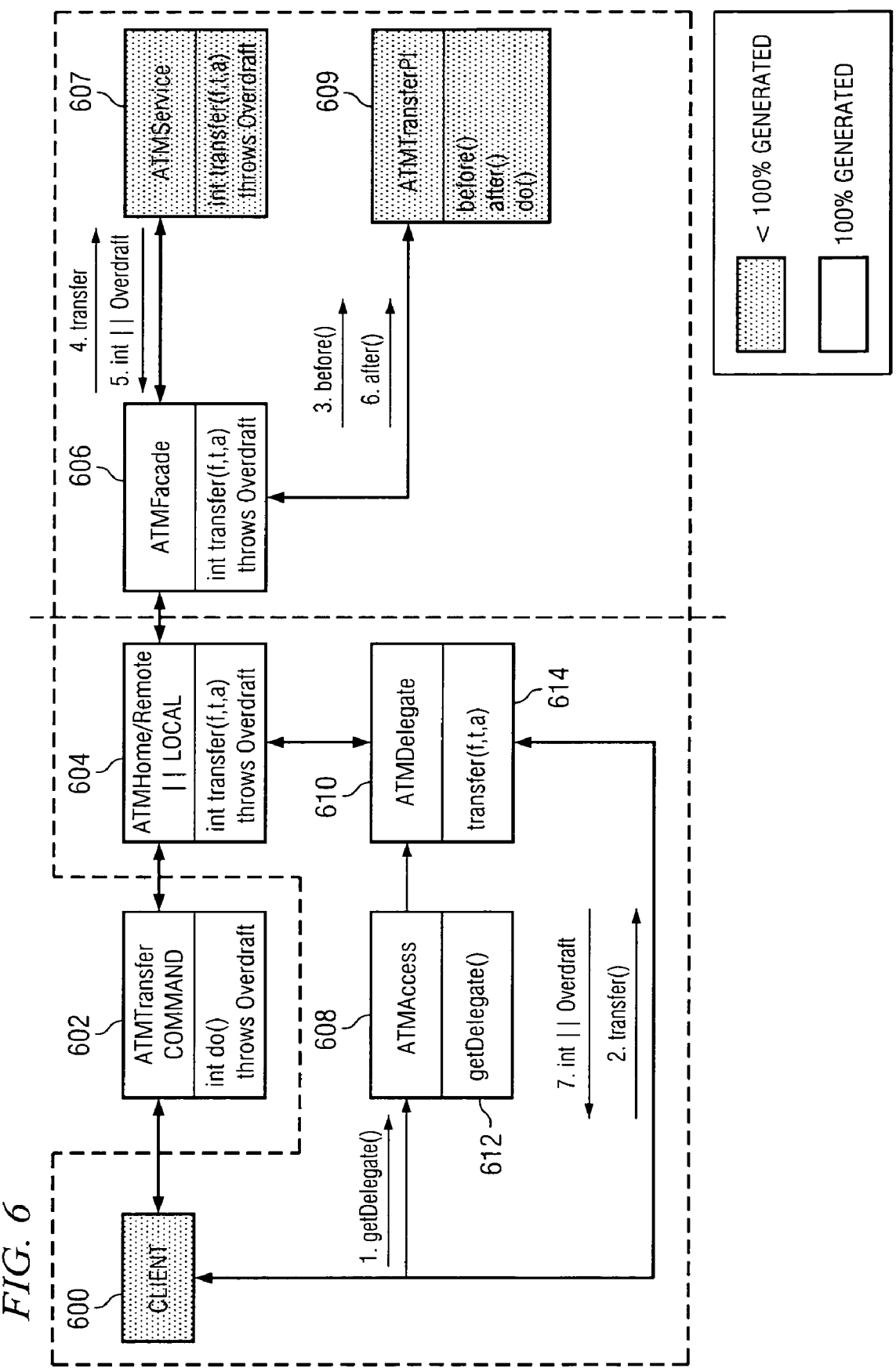
FIG. 6 depicts a data flow diagram illustrating exemplary operations of the business delegate and application façade in accordance with an illustrative embodiment of the present invention.

After application definition file 500 is defined, the enterprise application developer generates code components by applying the business delegate and application façade to the model. Turning now to FIG. 6, a data flow diagram illustrating exemplary operations of the business delegate and application façade is depicted in accordance with an illustrative embodiment of the present invention.

As illustrated in FIG. 6, the integrated generator identifies a subset of components from the system library based on what enterprise application developers defined in the application definition file and generates object components and service components from the subset of components. Object components are 100 percent generated while service components are less than 100 percent generated. Service components are also known as skeleton code, which may be edited by developers to implement business logic of the service. Examples of object components include ATMTransfer Command 602, ATM Home/Remote/Local EJB 604, ATMFacade 606, ATMAccess 608 and ATMDelegate 610. Examples of service objects include ATMService 607 and ATMTransferPI 609.

Client 600 first invokes static getDelegate( ) method 612 of ATMAccess 608 to get a reference of ATMDelegate 610. Client 600 then calls strongly typed business method transfer 614 in ATMDelegate 610. Façade instance ATMFacade 606 handles any "before" logic that is defined, for example, by invoking a before method in ATMTransferPI 609 to start a debug trace. Once the "before" logic is handled, ATMService 607 with actual business logic implemented by the developer performs the transfer function and returns the result to ATM-Facade 606. If an "after" logic is defined, ATMFacade 606 handles the "after" logic by invoking an after method in ATMTransferPI 609. Once the "after" logic is handled, the result is returned to client 600.

Thus, with the business delegate and application façade, separation of system and application logic is achieved. In addition, with strong typing classes and methods, parallel development and testing may be performed.

The second component of the system library is server property. In some cases, shared persistent data needed by the system logic may not change during the server lifecycle. Thus, the data may only be loaded and cached once at startup. Usually, this data is provided from property files. In order to encapsulate the shared persistent data, the system library includes a server property to load initial values from the property files and retrieve the values.

Turning now to FIG. 7, an exemplary application definition file for defining a server property is depicted in accordance with an illustrative embodiment of the present invention. As shown in FIG. 7, in application definition file 700, an enterprise application developer defines a server property by specifying a scope. In this example, a scope of "server" 702 is defined, which indicates to the integrated generator that this is a server property definition. Thus, when the integrated generator processes application definition file 700, the integrated generator generates a set of code components for loading and retrieving server properties. In this example, a property of "UniqueKey" 704, "UniqueValue" 706, "UniqueFlag" 708, and "UniqueDate" 710 are defined.

Figure 8:
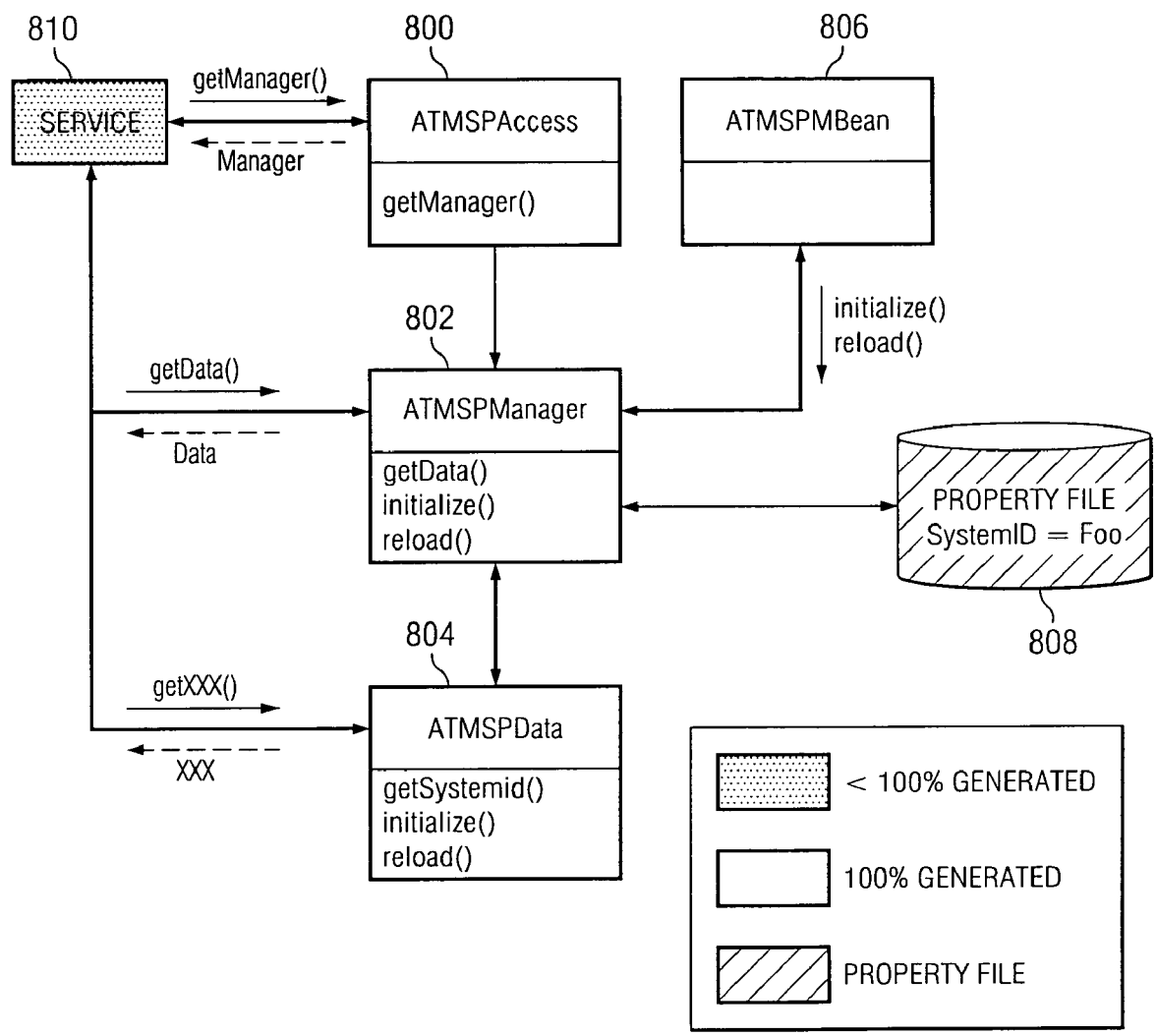
FIG. 8 depicts a data flow diagram illustrating exemplary operations of the server property component in accordance with an illustrative embodiment of the present invention.

After application definition file 700 is defined, the enterprise application developer generates code components by applying the server property component to the model. The integrated generator recognizes the scope of "server" as defined in application definition file 700 and generates a different set of code components. Turning now to FIG. 8, a data flow diagram illustrating exemplary operations of the server property component is depicted in accordance with an illustrative embodiment of the present invention.

As shown in FIG. 8, the integrated generator identifies a subset of components from the system library based on what enterprise application developers defined in the application definition file and generates different object components and service components from the subset of components. In this example, object components include ATMSPAccess 800, ATMSPManager 802, ATMSPData 804, and ATMSPMBean 806.

The basic idea for server property is to provide an object that has strongly typed get methods to obtain a property of any type, primitive or not. Service 810 may then use the get methods to obtain server properties. In this example, when the server starts up, properties file 808 is parsed and read into ATMSPData 804, which acts as a cache. Once the properties are read, service 810 may obtain ATMSPData 804 instance via ATMSPAccess 800 and ATMSPManager 802. Service 810 first calls getManager to retrieve ATMSPManager 802 and then calls getData to retrieve properties from ATMSP-Data 804. In addition to loading the data, ATMSPManager 802 has a reload method that reloads the properties without restarting the server. This process may be initiated by ATM-SPMBean 806.

The third component of the system library is request context. As shown in FIG. 6, the business delegate and application façade passes data along the request stream without changing method signatures in order to achieve the quality of service that is transparent to the developers. In addition, data is also passed between business logic and persistent layers or subsystems. Request context helps dealing with this transient data. There are two types of request context, a system request context and a user request context, which can be customized by the user. The request context allows a service to retrieve values, update the values, and convert the context to visible string. The request context lives as long as the single request.

In FIG. 9, an exemplary application definition file for defining a request context is depicted in accordance with an illustrative embodiment of the present invention. As shown in FIG. 9, in application definition file 900, an enterprise application developer defines a request context by specifying a scope. In this example, a scope of "request" 902 is defined, which indicates to the integrated generator that this is a request context definition. In this example, AtmRequestContext 904 is defined with two properties: CustomerNo 906 and StartDate 908.

Figure 10:
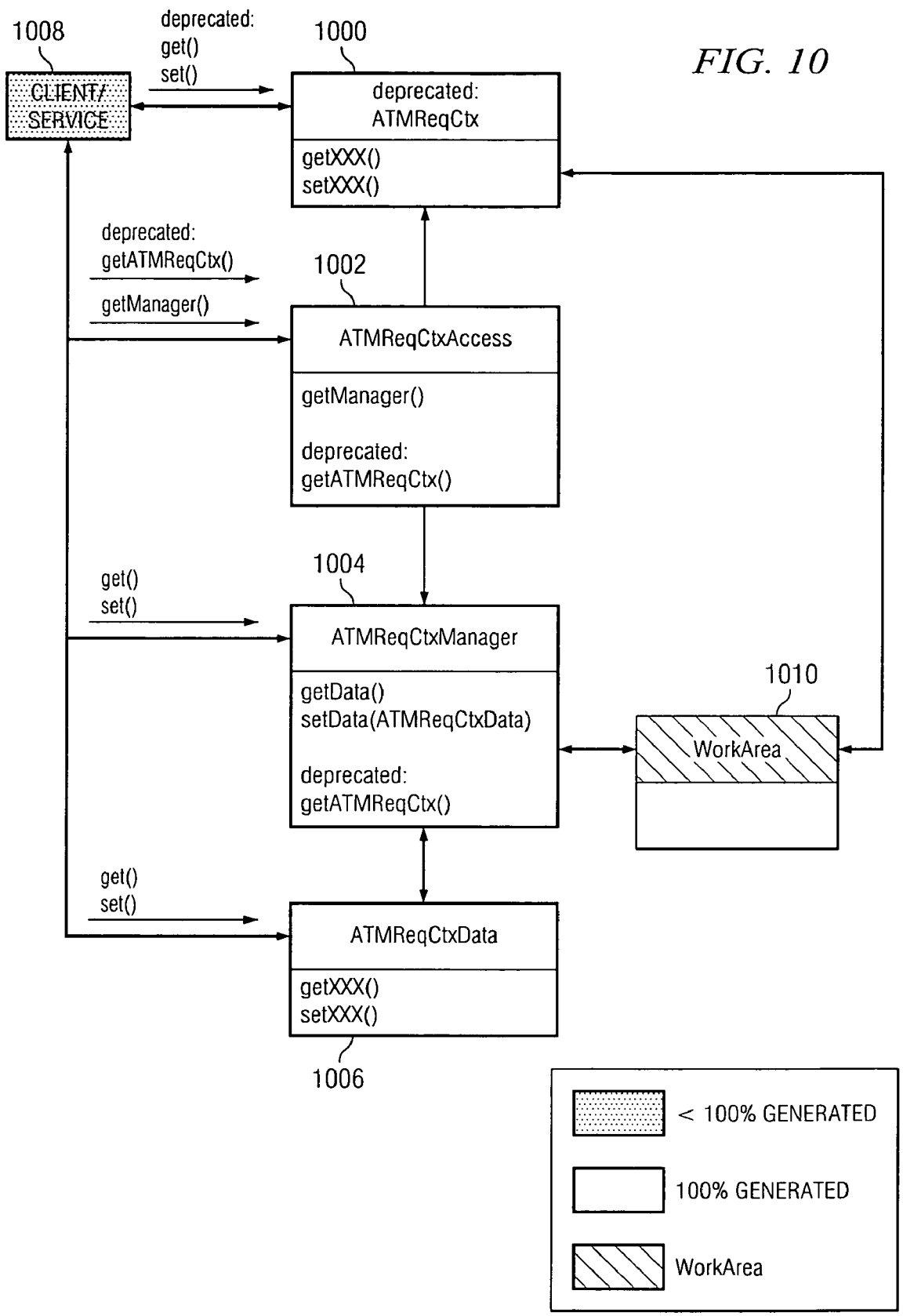
FIG. 10 depicts a data flow diagram illustrating exemplary operations of the request context component in accordance with an illustrative embodiment of the present invention.

After application definition file 900 is defined, the enterprise application developer generates code components by applying the request context component to the model. The integrated generator recognizes the scope of "request" as defined in application definition file 900 and generates a different set of code components. Turning now to FIG. 10, a data flow diagram illustrating exemplary operations of the request context component is depicted in accordance with an illustrative embodiment of the present invention.

As shown in FIG. 10, the integrated generator identifies a subset of components from the system library based on what enterprise application developers defined in the application definition file and generates different object components and service components from the subset of components. In this example, object components include ATMReqCtx 1000, ATMReqCtxAccess 1002, ATMReqCtxManager 1004, and ATMReqCtxData 1006.

The basic idea of request context is to provide strongly typed data access service to client or service 1008 to put data into WorkArea, which is a framework component. Similar to server property operations in FIG. 8, client or service 1008 obtains an instance of ATMReqCtxManager 1004 via ATM-ReqCtxAccess 1002 using a getManager method. Client or service 1000 then invokes getData method to retrieve data from ATMReqCtxData 1006, which acts as a cache. Thus, the retrieving method has a name that corresponds to the business method.

If no data is found, ATMReqCtxManager 1004 may perform a Java native directory interface (JNDI) lookup to obtain work area variables and a name corresponding to the service. In addition to transient data, transactional statistic data may be held in WorkArea 1010 as a key.

The fourth component is shared table. In addition to shared persistent data and transient data, low volume relatively stable read only shared persistent data may also be used to drive quality of service to developers. Shared table deals with this type of data. In one example implementation, a shared table may be implemented as a hashtable that is loaded from a database table. This shared data that is occasionally updated by a single user is maintained in an entity enterprise Java bean (EJB) and is cached in an Access bean.

A command line mechanism may be provided in the shared table component to modify values at runtime and push change to all servers in the cluster. The shared table component also includes a mechanism for fast access and maintaining data integrity with the database.

Thus, the shared table retrieves values and initializes the content at startup. A command line mechanism may be provided to re-initialize the content, dump content into a log file, update content, cancel to update the content and collect garbage in the cache. Turning now to FIG. 11, an exemplary application definition file for defining a shared table is depicted in accordance with an illustrative embodiment of the present invention. As shown in FIG. 11, in application definition file 1100, an enterprise application developer defines a shared table by specifying a scope. In this example, a scope of "cell" 1102 is defined, which indicates to the integrated generator that this is a shared table definition. In this example, a share table named "Branch" 1104 is defined with three properties: branched 1106, areaId 1108 and branchName 1110.

Figure 12:
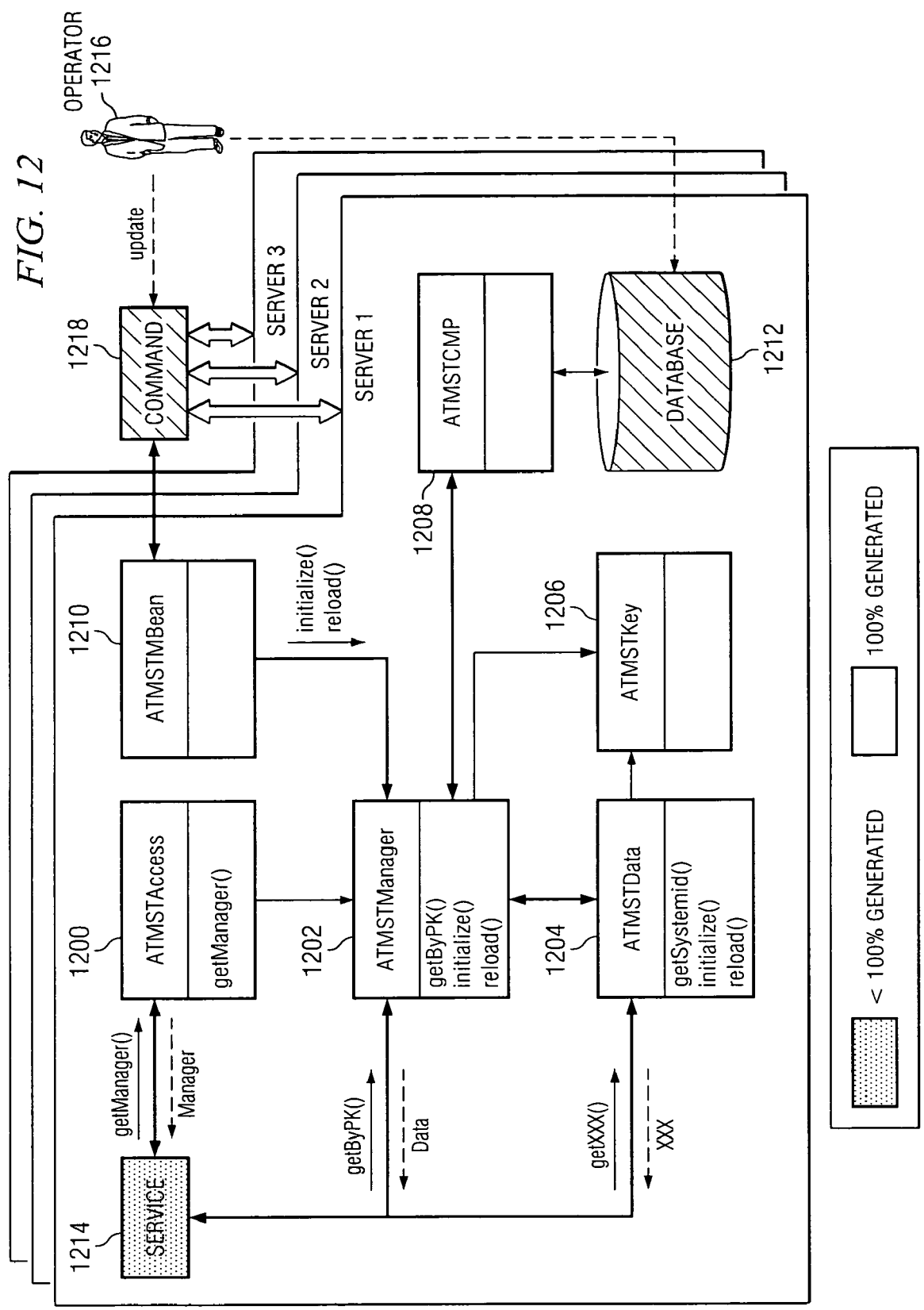
FIG. 12 depicts a data flow diagram illustrating exemplary operations of the shared table component in accordance with an illustrative embodiment of the present invention.

After application definition file 1100 is defined, the enterprise application developer generates code components by applying the shared table component to the model. The integrated generator recognizes the scope of "cell" as defined in application definition file 1100 and generates a different set of code components. The shared table component applies changes made to the cache to all servers in the cluster. Turning now to FIG. 12, a data flow diagram illustrating exemplary operations of the shared table component is depicted in accordance with an illustrative embodiment of the present invention.

As shown in FIG. 12, the integrated generator identifies a subset of components from the system library based on what enterprise application developers defined in the application definition file and generates different object components and service components from the subset of components. In this example, object components include ATMSTAccess 1200, ATMSTManager 1202, ATMSTData 1204, ATMSTKey 1206, ATMSTCMP 1208, and ATMSTMBean 1210.

When the server starts up, shared persistent data is retrieved from database 1212 using a container managed persistent bean, such as ATMSTCMP 1208, and a ATMSTData instance 1204 that caches the shared data is created. Service 1214 then gets ATMSTData instance 1204 via ATMSTAccess 1200 and ATMSTManager 1202 by calling the get methods to read the properties. All get methods obtain data from the cache.

If operator 1216 updates the shared data, operator 1216 first updates database 1208 using scripts for database maintenance. Then, operator 1216 issues a command via command line mechanism 1218 to update the cache of shared table. ATMSTMBean 1210 calls a reload method of ATMSTManager 1202 to retrieve the data from database 1212 using ATMSTCMP 1208. In this way, the cache is always updated.

The fifth component of the system library is access manager. In order to obtain references to components and resources, access manager is provided in the system library to access the resources using JNDI lookup.

Turning now to FIG. 13, an exemplary application definition file for defining an access manager is depicted in accordance with an illustrative embodiment of the present invention. As shown in FIG. 13, in application definition file 1300, an enterprise application developer defines an access manager by specifying an access element 1302. In this example, an access element is defined, which indicates to the integrated generator that this is an access manager definition. In this example, access element 1302 includes a type of "jndi" 1304, a name of "ConnectionFactory" 1306, and an implementation class 1308.

Figure 14:
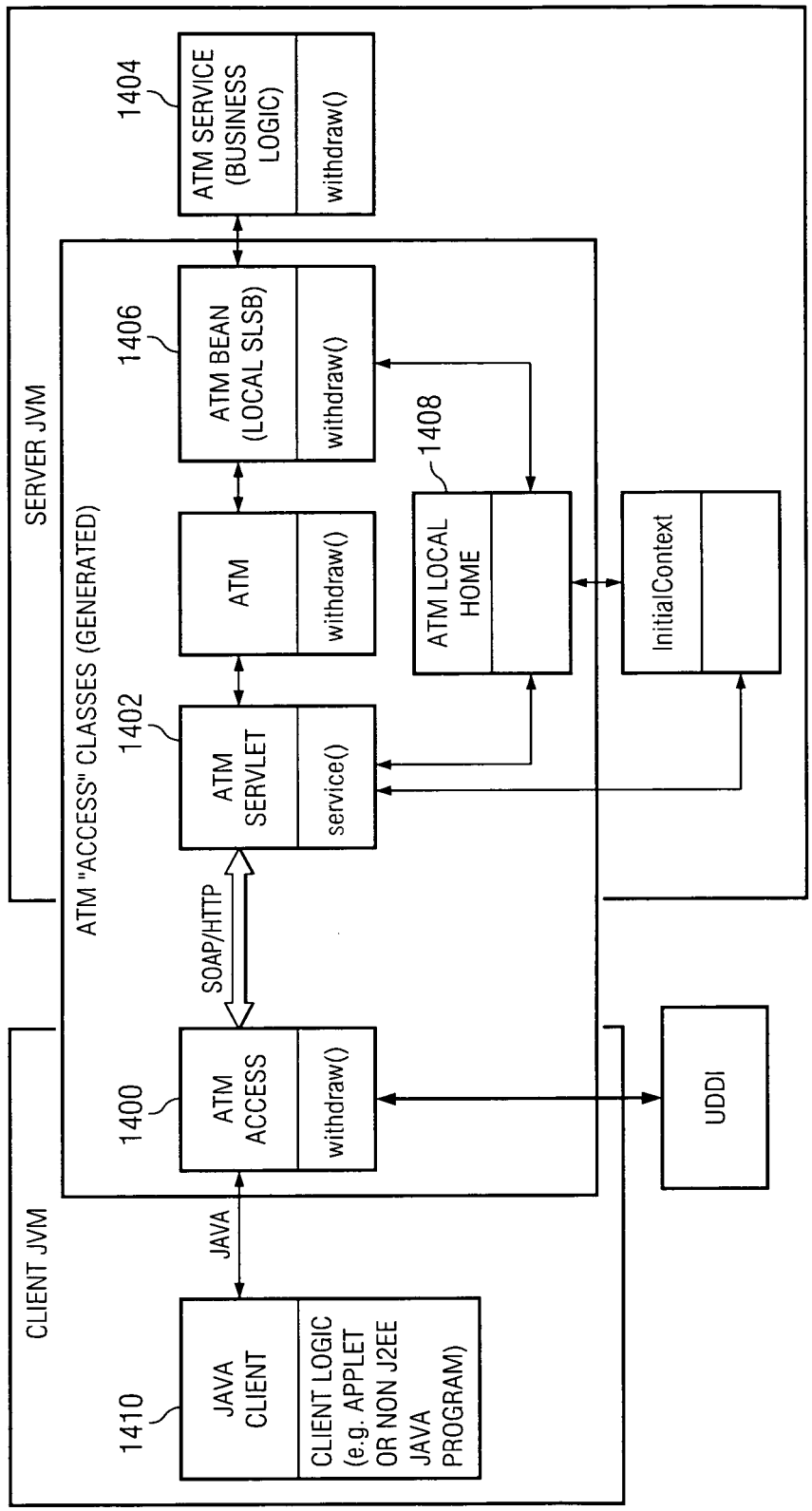
FIG. 14 depicts a data flow diagram illustrating exemplary operations of the access manager component in accordance with an illustrative embodiment of the present invention.

After application definition file 1300 is defined, the enterprise application developer generates code components by applying the access manager component to the model. The integrated generator recognizes the access element as defined in application definition file 1300 and generates a different set of code components. Turning now to FIG. 14, a data flow diagram illustrating exemplary operations of the access manager component is depicted in accordance with an illustrative embodiment of the present invention.

As shown in FIG. 14, the integrated generator identifies a subset of components from the system library based on what enterprise application developers defined in the application definition file and generates different object components and service components from the subset of components. In this example, object components ATMAccess 1400, ATMServlet 1402, ATMService 1404, ATMBean 1406, and ATMLocalHome 1408 are generated. Client 1410 first gets a reference of ATMAccess 1400 and calls its service method. ATMAccess 1400 handles client side "before" logic that is defined by retrieving an HTTP connection to the service URL, formatting the message in SOAP, and sends the request to ATMServlet 1402. Alternatively, instead of using SOAP, ATMAccess 1400 may use UDDI to retrieve a service URL from a logical name, similar to retrieving a Home from JNDI.

In turn, ATMServlet 1402 has a "service" method that demarshals the SOAP message into Java parameters and invokes the business method on ATMBean 1406, which is a local stateless session bean. ATMBean 1406 then handles server side "before" logic and calls withdraw method of ATMService 1404. ATMService 1404 performs the withdraw function and returns the result to ATMBean 1406. ATMBean 1406 handles the server side "after" logic before returning to ATMServlet 1402. Upon receiving the result, ATMServlet 1402 formats the result into a SOAP reply and writes it into a HTTP response object and returns the message to ATMAccess 1400. Finally, ATMAccess 1400 handles client side "after" logic, such as exception handling, caching, and retrying, before returning the result to client 1410. While ATMAccess 1400 does not have to handle any remote exceptions, it has to handle HTTP and SOAP related errors.

The sixth component of the system library is a logging/trace component. The purpose of this logging/trace component is to provide an easy, unified and customizable mechanism for logging and trace. The logging/trace component generates log files or system console logs. In addition, the logging/trace code generated classes are used by the application façade to output logs and traces. With the logging/trace component, developers no longer have to provide implementation details for the writing general logging/trace code. Furthermore, the logging/trace component allows logging/trace to be customized based on the configuration, formats messages from the generated templates, controls the output, and manages log files.

With reference now to FIG. 15, an exemplary application definition file for defining a logging/trace component is depicted in accordance with an illustrative embodiment of the present invention. As shown in FIG. 15, application definition file 1500 is part of application definition file 500 in FIG. 5, where a service is defined. In this example, application definition file 1500 includes debug trace definitions, such as debug trace "test" 1502. Debug trace "test" 1502 outputs to an information log, such as information log "input" 1504.

Figure 16:
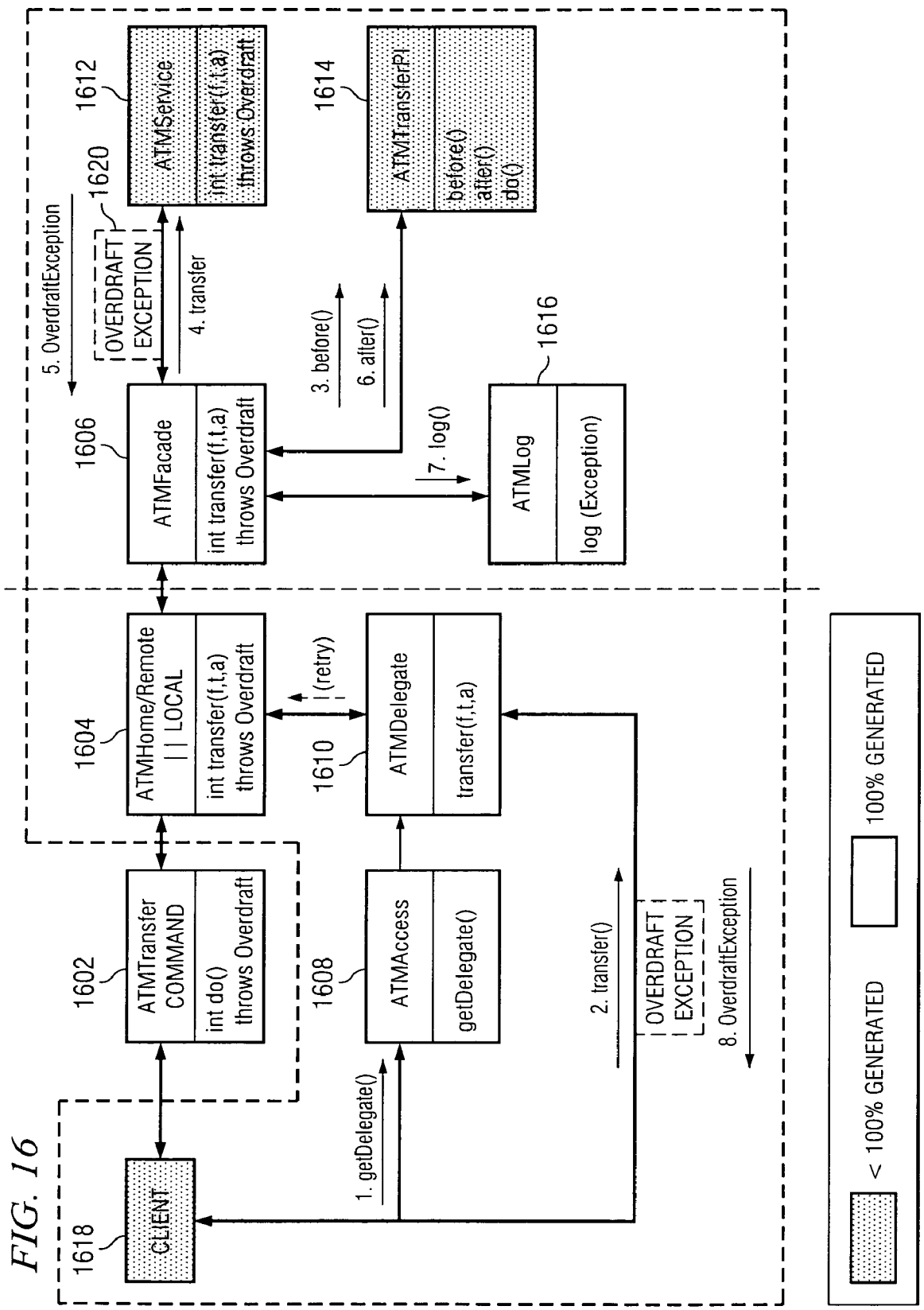
FIG. 16 depicts a data flow diagram illustrating exemplary operations of the logging/trace component in accordance with an illustrative embodiment of the present invention.

After application definition file 1500 is defined, the enterprise application developer generates code components by applying the logging/trace component to the model. Turning now to FIG. 16, a data flow diagram illustrating exemplary operations of the logging/trace component is depicted in accordance with an illustrative embodiment of the present invention.

As shown in FIG. 16, the integrated generator identifies a subset of components from the system library based on what enterprise application developers defined in the application definition file and generates object components and service components from the subset of components. Similar to FIG. 6, object components ATMTransfer command 1602, ATM-Home/Remote/Local bean 1604, ATMFacade 1606, ATMAccess 1608, ATMDelegate 1610, ATMService 1612, and ATMTransferPI 1614 are generated. In addition, object component ATMLog 1616 is generated.

Also similar to FIG. 6, client 1618 gets reference to ATMDelegate 1610 via ATMAccess 1608 and invokes its service method. However, while ATMService 1612 is performing the function of the service method, an exception is thrown because a logical condition is present that prevents normal execution of the application. In this example, overdraft exception 1620 is thrown.

Upon encountering an exception, ATMAccess 1608 first retries to call the service method. If overdraft exception 1620 continues to be thrown, ATMAccess 1608 logs the exception by calling a log(Exception) method of ATMLog 1616, which is generated by the integrated generator. The exception will be logged in a log file specified in an application definition file, such as application definition file 1500 in FIG. 15. The granularity of the logging/trace may be chosen by application developers by picking a layer in the hierarchy of the service structure to log exceptions. In this way, client 1618 no longer needs to log the exception in the log file. Instead, client 1618 may use the exception in the log file for informational purposes.

The seventh component of the system library is a transaction monitor. Transaction monitor maintains performance statistics of runtime transactions and provides monitoring and notification of long running transactions. Thus, transaction monitor monitors transactions, retrieves transaction information, and retrieves statistics information.

Turning now to FIG. 17, an exemplary application definition file for defining a transaction monitor is depicted in accordance with an illustrative embodiment of the present invention. As shown in FIG. 17, application definition file 1700 is part of application definition file 500 in FIG. 5, where a service is defined. In this example, application definition file 1700 includes performance statistics 1702, which includes begin time 1704, process count 1706, and result text 1708.

Figure 18:
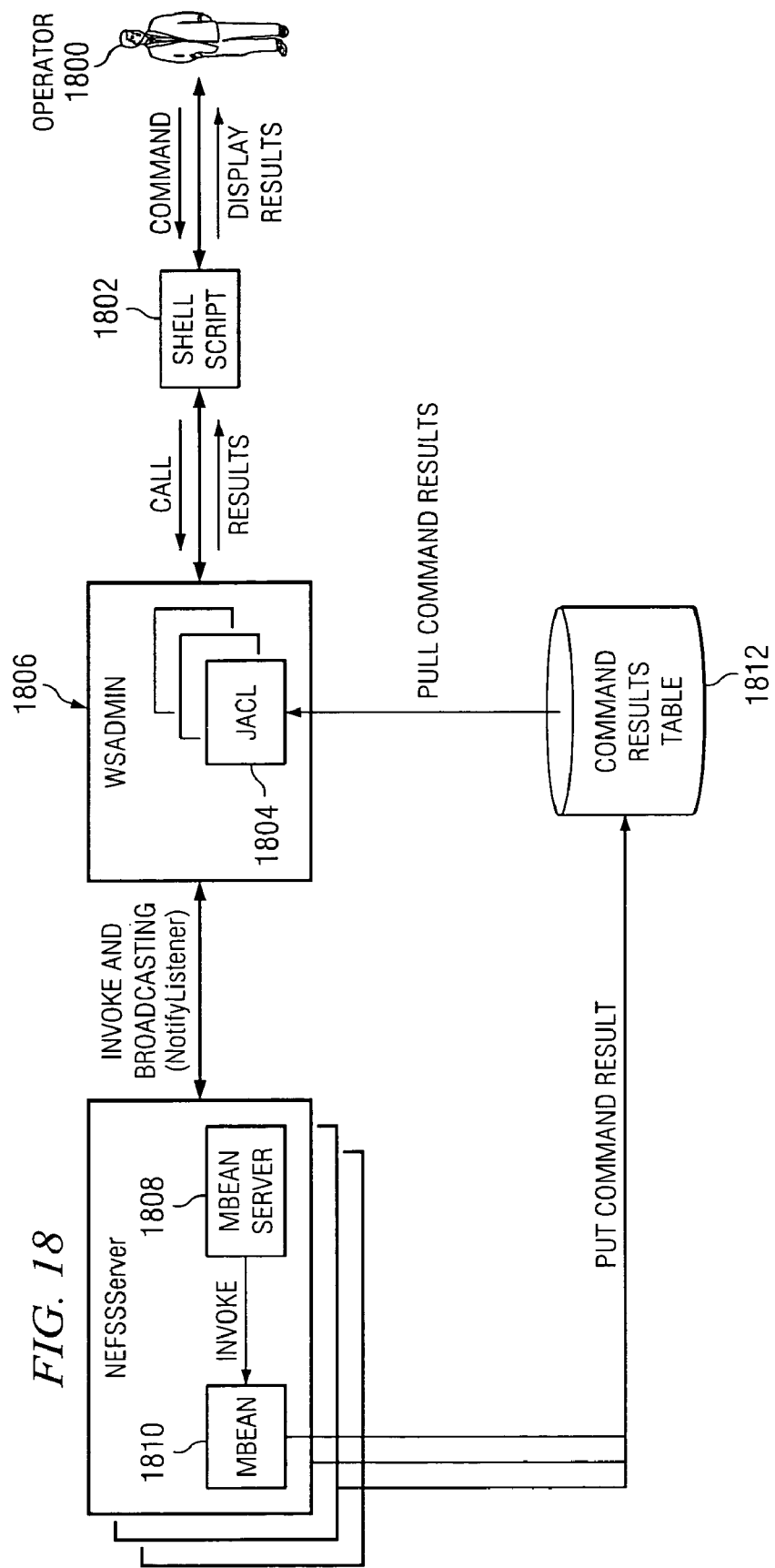
FIG. 18 depicts a data flow diagram illustrating exemplary operations of the transaction monitor in accordance with an illustrative embodiment of the present invention.

After application definition file 1700 is defined, the enterprise application developer generates code components by applying the transaction monitor to monitor transactions. Turning now to FIG. 18, a data flow diagram illustrating exemplary operations of the transaction monitor is depicted in accordance with an illustrative embodiment of the present invention.

As shown in FIG. 18, the integrated generator identifies a subset of components from the system library based on what enterprise application developers defined in the application definition file and generates object components, such as Mbean 1810, and service components from the subset of components. Operator 1800 opens a command prompt and issues command shell script 1802 to request a list of server properties. The command supports multiple remote servers with one action. In turn, command shell script 1802 calls Jacl scripts 1804 that are running on the application server software, such as wsadmin 1806. Jacl scripts 1804 are tool command language scripts that dispatch multiple requests to all servers, including MBeanServer 1808. MBean 1810, which runs on MBeanServer 1808, retrieves the server properties in a manner similar to FIG. 8 and stores the results in command result table 1812. During appropriate timeouts, Jacl scripts 1804 poll the result database and pull the results from each server. When Jacl scripts 1804 pull all the results from the servers, Jacl scripts 1804 aggregates them into a formatted list to present the results to operator 1800.

The eighth component of the system library is a command service. Command service supports a vast amount of operations that change run time properties, query runtime properties, or query status of system library components without halting service. Command service also provides detection of application server failure. Command service includes a command client, a command server, and a command execution server proxy. Operators invoke commands from the command client via the network and the appropriate MBean on the command server returns the response to the command client. Command invocation depends on the target command server, which may be a single target or multiple targets. In case of multiple targets, responses from each server are aggregated and returned to the command client. With the command service, developers may customize commands and invoke the commands.

With reference to FIG. 19, an exemplary application definition file for defining a command service is depicted in accordance with an illustrative embodiment of the present invention. As shown in FIG. 19, in application definition file 1900, an enterprise application developer defines a command service by specifying a command element 1902. In this example, a command element is defined, which indicates to the integrated generator that this is a command service definition. Within command element 1902, mbean BankAdmin 1904 and command line 1910 are defined. Mbean BankAdmin 1904 has two operations: setBankingDate 1906, and putAllAttributes 1908. Command line 1910 includes two corresponding operations: set_banking_date 1912, and put_all_attr 1914.

Figure 20:
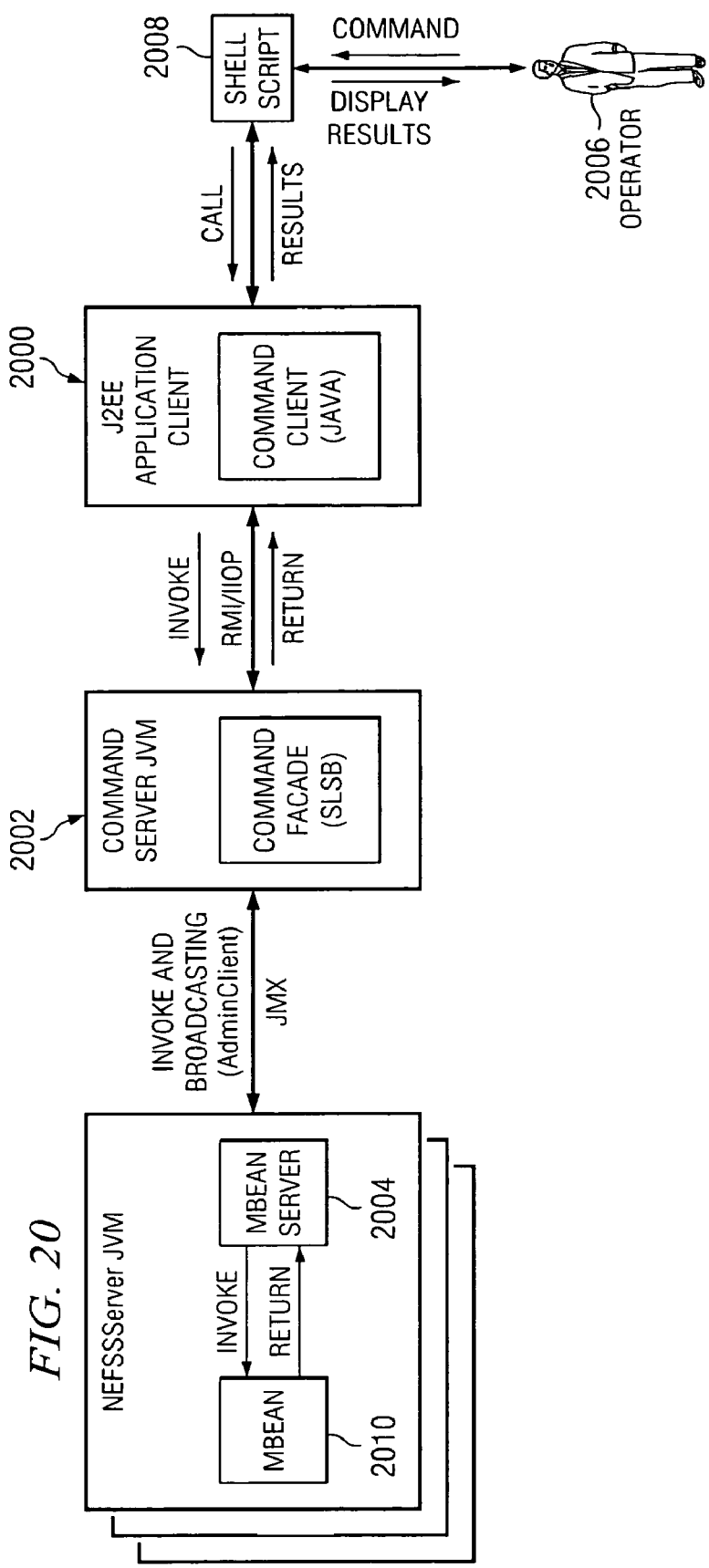
FIG. 20 depicts a data flow diagram illustrating exemplary operations of the command service in accordance with an illustrative embodiment of the present invention.

After application definition file 1900 is defined, the enterprise application developer generates code components by applying the command service to the model. Turning now to FIG. 20, a data flow diagram illustrating exemplary operations of the command service is depicted in accordance with an illustrative embodiment of the present invention. As shown in FIG. 20, the integrated generator identifies a subset of components from the system library based on what enterprise application developers defined in the application definition file and generates object components and service components from the subset of components. In this example, object components command client 2000, command server façade stateless session bean 2002, and a common execution server proxy, MBeanServer 2004.

Similar to FIG. 18, operators 2006 issue commands to request a list of server properties by using command shell scripts 2008. Command shell scripts 2008 receive the request via command client 2000 and delegate the request to command façade 2002 remotely. The request may be communicated to command façade via remote message exchange protocols, such as IIOP and Remote Method Invocation (RMI). Once command façade 2002 receives the request, command façade 2002 calls MBean 2010 on each server using a message exchange format, such as JMX. In turn, MBean 2010 retrieves the server properties and writes the results to a log. Command façade 2002 returns the status of whether each of the requests succeeds or fails to command shell scripts 2008 via command client 2000. Operator 2006 may check the result in the log once the status is returned.

The ninth component of the system library is startup and shutdown. Due to dependencies between applications and services, these applications and services have to be started and stopped in a specific order. The startup/shutdown bean takes into account these dependencies. Developers may create custom classes for starting up and shutting down the system library using the skeleton code generated by the integrated generator.

Turning to FIG. 21, an exemplary application definition file for defining a startup bean is depicted in accordance with an illustrative embodiment of the present invention. As shown in FIG. 21, in application definition file 2100, an enterprise application developer defines a command service by specifying a scope of "startup" 2102. In this example, a scope of "startup" is defined, which indicates to the integrated generator that this is a startup bean definition. Within startup bean, an initial method with initial parameter "Withdraw01" 2104 and a terminal method with a terminal parameter "Withdraw02" 2106 are defined.

Figure 22:
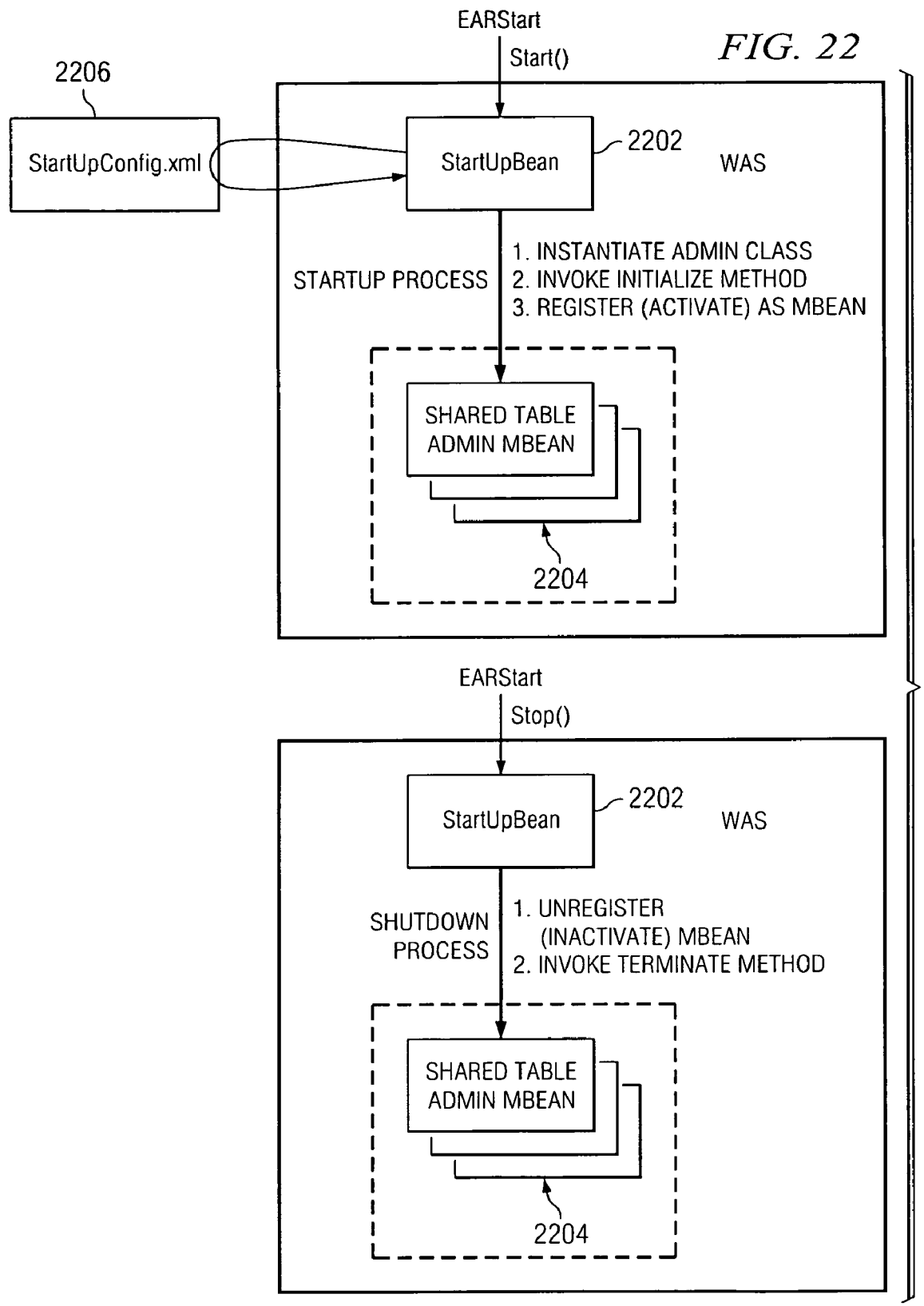
FIG. 22 depicts a data flow diagram illustrating exemplary operations of the startup bean in accordance with an illustrative embodiment of the present invention.

After application definition file 2100 is defined, the enterprise application developer generates code components by applying the startup bean to the model. Turning now to FIG. 22, a data flow diagram illustrating exemplary operations of the startup bean is depicted in accordance with an illustrative embodiment of the present invention.

As shown in FIG. 22, the integrated generator identifies a subset of components from the system library based on what enterprise application developers defined in the application definition file and generates different object components and service components from the subset of components. In this example, object component StartUpBean 2202 is generated.

StartUpBean 2202 reads the configuration file and executes the startup process to launch all listed components in the file. An example of the configuration file is StartUpConfig.xml 2206. StartUpBean 2202 performs the startup process by setting status of the system library as "starting" and launching each component in order. To launch the components, StartUpBean 2202 instantiates SharedTable AdmMBean 2204 and invokes its initialized method to register as an MBean for each server. Once the last component is started, the status of the system library is updated by StartUpBean 2202 to "ready".

When the system library is shutdown, StartUpBean 2202 changes the status of the system library to "terminating" through a synchronized call, and the runtime transaction count is checked. Based on the initial and terminal methods defined in application definition file 2100 in FIG. 21, the integrated generator generates strongly typed parameter classes for initializing and terminating the system library. For example, initial parameter "Withdraw01" 2104 is generated as a strongly typed class name WithDraw01InitialParameter with a getFilePath and setFilePath method.

The tenth component of the system library is exception. The aspects of the present invention leave details of handling errors to the delegate or façade classes of the model. The exception handling hierarchy includes a single exception interface at the root that minimizes impact on the method signatures. Below the root exception, two exception classes are present. One exception is AppException for describing application exceptions. The other exception is SystemException for describing system exceptions.

Turning now to FIG. 23, an exemplary application definition file for defining an exception is depicted in accordance with an illustrative embodiment of the present invention. As shown in FIG. 23, in application definition file 2300, an enterprise application developer defines an exception by specifying a scope of "exception" 2302. In this example, a scope of exception is defined, which indicates to the integrated generator that this is exception definition. SampleException 2304 includes a messageID of "SAMPLE01E" 2306 and a description of "sample exception" 2308.

Figure 24:
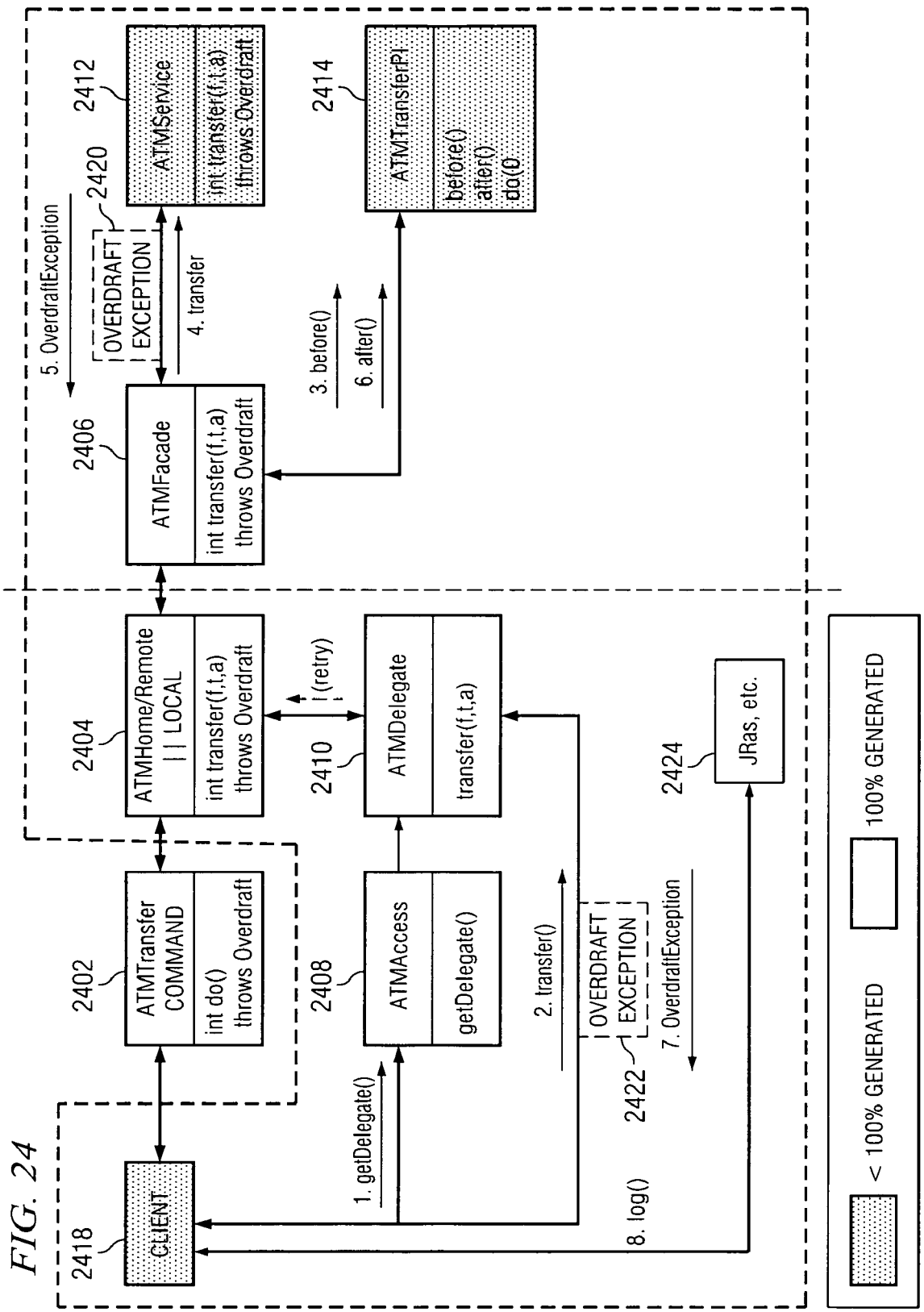
FIG. 24 depicts a data flow diagram illustrating exemplary operations of the exception in accordance with an illustrative embodiment of the present invention.

After application definition file 2300 is defined, the enterprise application developer generates code components by applying the exception to the model. In FIG. 24, a data flow diagram illustrating exemplary operations of the exception is depicted in accordance with an illustrative embodiment of the present invention.

As shown in FIG. 24, the integrated generator identifies a subset of components from the system library based on what enterprise application developers defined in the application definition file and generates object components and service components from the subset of components. In this example, similar to FIG. 16, object components ATMTransfer command 2402, ATMHome/Remote/Local bean 2404, ATMFacade 2406, ATMAccess 2408, ATMDelegate 2410, ATMService 2412, and ATMTransferPI 2414 are generated.

Client 2418 gets reference to ATMDelegate 2410 via ATMAccess 2408 and invokes its service method. However, while ATMService 2412 is performing the function of the service method, an exception is thrown because a logical condition is present that prevents normal execution of the application. In this example, overdraft exception 2420 is thrown.

Upon encountering an exception, ATMAccess 2408 first retries to call the service method in case of a strong possibility to succeed. For example, the exception is caused by the lock timeout of the database access. The definition of whether retrying is needed as well as retrying times are associated with messageID 2306 in FIG. 23. This kind of exception is referred to as UncheckedException to avoid a transactional duplication. The developers may customize the logic of the retry using a RetryHandler class. If retry times are exhausted, the exception is raised to client 2418.

Since overdraft exception 2420 occurs, instead of returning a normal value, overdraft exception 2422 is returned to client 2418. Client 2418 may catch the service exception and write its own code to output logs using JRas interface 2424. JRas is an interface provided by WebSphere Application Server environment. WebSphere Application Server is a product available from International Business Machines Corporation.

Figure 25:
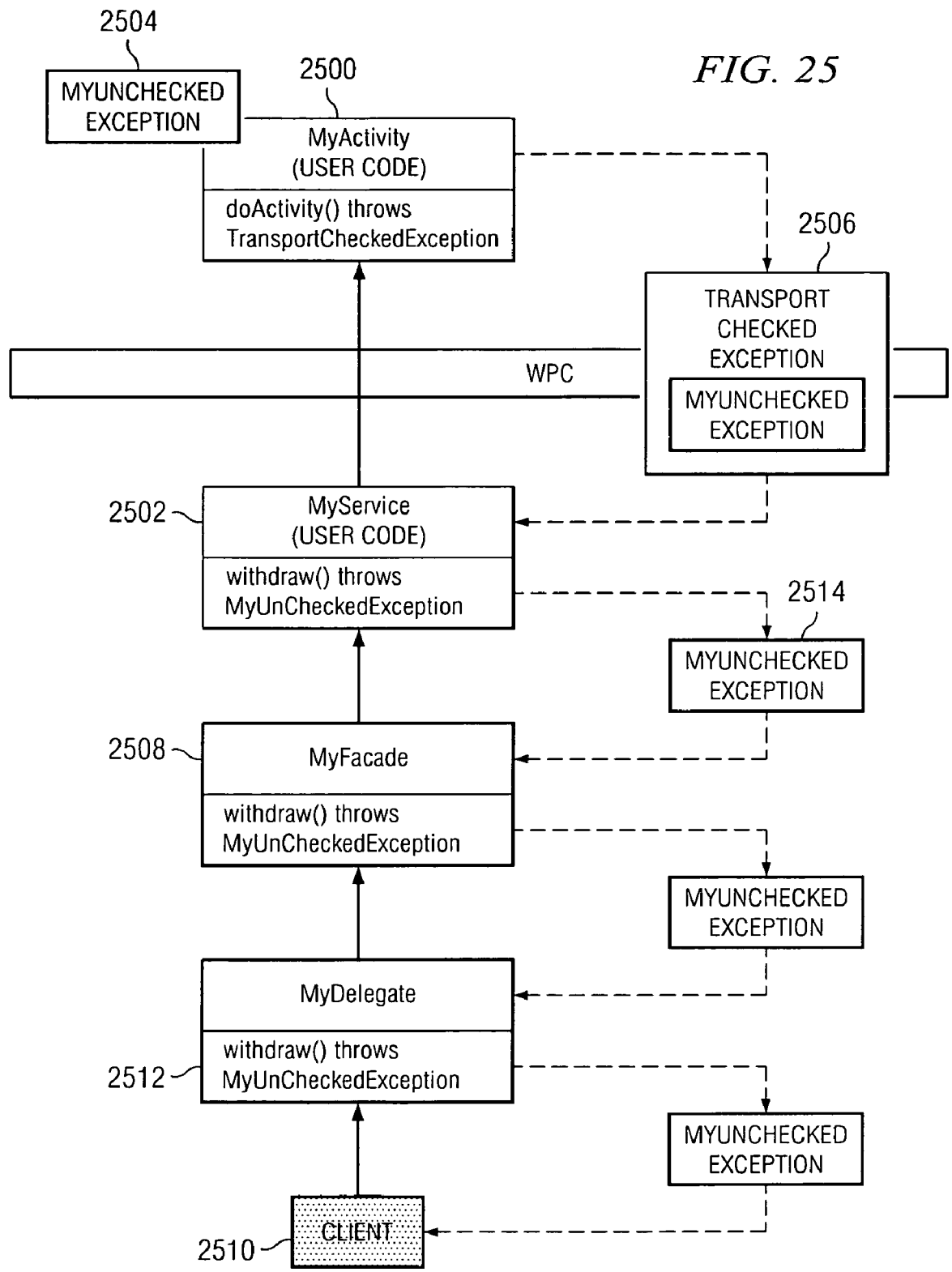
FIG. 25 depicts a diagram illustrating how a client may handle service exceptions by wrapping the UncheckedException inside a CheckedException in accordance with an illustrative embodiment of the present invention.

Turning now to FIG. 25, a diagram illustrating how a client may handle service exceptions by wrapping the UncheckedException insider a CheckedException is depicted in accordance with an illustrative embodiment of the present invention. Checked exceptions are exceptions that are analyzed at compile time by the compiler to ensure that a handler is present to handle the exceptions. UncheckedExceptions are either subclasses of RuntimeExceptions or Error that are caught at runtime. Since Remote Exception does not provide the means to extract original exception information of the service exception when it is thrown, the exception information is lost and no message is logged. By wrapping the unchecked exception inside the checked exception, original exception information may be caught and logged.

As depicted in FIG. 25, client 2510 may develop MyActivity 2500 and MyService 2502 user code to pack the MyUncheckedException 2504 into TransportCheckedException 2506 and throw TransportCheckedException 2506 to MyService 2502. MyService 2502 catches it and unpacks MyUncheckedException 2504 from TransportCheckedException 2506, and throws MyUncheckedException 2514 to MyFacade 2508. Client 2510 then catches MyUncheckedException 2514 through MyFacade 2508 and MyDelegate 2512.

With the exception definition, MyFacade 2508 and MyDelegate 2512 may be generated to handle the passing of the exception while MyActivity 2500 and MyService 2502 are skeleton code that may be edited by the user.

The eleventh component of the system library is the integrated generator. Integrated generator provides a code generation framework that reduces coding work of developers. With predefined templates such as the application definition files, program code may be automatically generated with parameters assigned. The integrated generator generates strongly typed components and skeleton code by applying best practice pattern of usage for the target platform. An example of the integrated generator is the design pattern toolkit V3.0 available as part of Eclipse 3.0. Design pattern toolkit and Eclipse are products available from International Business Machines Corporation.

The integrated generator has a model-view-controller architecture that is used to generate a class of applications including database enterprise Java beans, IDE extensions and J2EE applications. The model is an implicit XML schema that describes information that is unique to the application being generated. The schema describes what information is required to build an instance of the class of applications. Enterprise developers may modify the schema to minimize information needed from users of the application. The view is a collection of templates that contain static common content of resources to be generated. These templates include tags that direct generation of code components and insert data into generated code components from the defined platform independent models. The controller is a set of special XML tags that control when and how each template is applied. These tags may be embedded in a template. Multiple platform independent models can be merged using the view.

FIGS. 26A-26E depict an exemplary XML schema for generating a service framework in accordance with an illustrative embodiment of the present invention. XML schema 2600 defines the interfaces of the pattern to be applied to the model. The controller manages the structure of the generated code components through values in the model instance, which is a document that follows the schema. Examples of the model instance include application definition files that are described in the previous figures.

As shown in FIG. 26A, in this example implementation, XML schema 2600 includes a definition of a service known as serviceType 2602. Within serviceType 2602, a service method 2604 or a service command 2606 are defined. Service method 2604 is defined by serviceMethodType 2608, which includes definitions for a service method parameter 2610, service method exception 2612, service method informationLog 2614, service method debugTrace 2616, service method snippet 2618, and service method performanceStatisticsType 2620.

Service command 2606 is defined in XML schema 2600 as shown in FIG. 26B. ServiceCommandType 2622 includes service command input 2624, service command output 2626, service command exception 2628, service command plugin 2630, service command exception handler 2632, service command information log 2634, service command debug trace 2636, service command snippet 2638, and service command performance statistics 2640.

In addition to a service, XML schema 2600 also includes a definition of a command. As shown in FIG. 26C, in this example implementation, XML schema 2600 includes a definition of a command known as commandType 2642. CommandType 2642 includes command mbean 2644, which includes command operation 2646. In addition, commandType 2642 includes command exception 2648 and commandLine 2650.

In addition to service and command, XML schema 2600 also includes a definition of an object. The object is a 100 percent generated code component. As shown in FIG. 26D, in this example implementation, XML schema 2600 includes a definition of an object known as objectType 2652. As described previously, enterprise application developers may indicate to the integrated generator what object components and service components to generate based on scope 2653. Scope 2653 may be one of the following: cell 2654 indicating shared table, server 2656 indicating a server property, request 2658 indicating a request context, application 2660 indicating an application context, exception 2664 indicating exception handling, startup 2666 indicating startup bean and applicationlog 2668 for logging/trace.

XML schema 2600 also includes a definition of an access manager. As shown in FIG. 26E, in this example implementation, XML schema 2600 includes a definition of an access known as accessType 2670. AccessType 2670 includes attributes such as package 2672 and implClass 2674.

In summary, aspects of the present invention provide enterprise application developers with a system library that has a core set of functions of a service industry, the ability to define platform independent models based on a schema, and the ability to generate a service framework that composes strongly typed components. In this way, usability and performance can be achieved. In addition, other best practice design patterns may be easily applied to the model by extending the definition in the schema.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating service frameworks, the method comprising:
    providing a system library comprising a set of components for the service frameworks, wherein the set of components includes object components and service components based on a set of platform independent models, wherein the set of platform independent models is defined by a user using a set of application definitions;
    identifying a subset of components from the set of components by an integrated generator;
    identifying a target platform for the service frameworks;
    generating the service frameworks by the integrated generator, wherein the service frameworks are deliverable to a client, wherein the service frameworks include a computer usable program code for the service frameworks, wherein the computer usable program code includes the object components and the service components, wherein the service frameworks include typed components, and wherein the typed components are weakly typed components or strongly typed components, wherein the generating step comprises:
    responsive to detecting an object definition comprising a scope of server in an application definition, generating an access class in the object components to retrieve a manager class;
    generating the manager class in the object components to retrieve server properties from a data class; and
    generating the data class in the object components to read server properties from a property file and cache the server properties at a server start up, wherein the data class includes get methods for accessing property values of the server properties, and wherein the data class includes a reload method to reload server properties from the property file if the property file is updated without a server restart; and
    storing the service frameworks on the data processing system, wherein the service frameworks are platform dependent.

2. The method of claim 1, wherein the object components are fully generated by an integrated generator and wherein the service components are edited by a user to implement service functions.

3. The method of claim 1 wherein the identifying step comprises:
    identifying a different subset of components for the service frameworks based on a different platform independent model in the set of platform independent models.

4. The method of claim 1, wherein the set of code components is generated based on a best practice pattern usage for a target platform of the service frameworks.

5. The method of claim 1, wherein the generating step comprises:
    responsive to detecting a definition of a service in an application definition, generating an access class in the object components to retrieve a business delegate;
    generating the business delegate in the object components, wherein the business delegate is used by a client to invoke a service method of a service represented by one of the service components,
    generating an application facade in the object components to handle server side before and after logic as defined in the application definition; and
    responsive to detecting an object definition comprising a scope of application, generating an application context for storing parameters and return values for business transactions between the client and the service.

6. The method of claim 5, wherein the before and after logic includes checking for service availability, retrieving a transaction identifier, starting a trace, and handling exceptions.

7. The method of claim 5, wherein the generating step further comprises:
    responsive to detecting an object definition comprising a scope at request in an application definition, generating an access class in the object components to retrieve a manager class;
    generating the manager class in the object components to retrieve shared data from a data class, wherein the manager class retrieves the shared data from a work area if the shared data is absent in the data class, and wherein the shared data is transient data shared between the business delegate and the application facade; and
    generating the data class in the object components to cache the shared data and hold transaction statistics data.

8. The method of claim 1, wherein the generating step comprises:
    responsive to detecting an object definition comprising a scope of cell in an application definition, generating an access class in the object components to retrieve a manager class;
    generating the manager class in the object components to retrieve persistent shared data from a data class;
    generating a container managed persistent bean in the object components to retrieve the persistent shared data from a shared table in a database via a shared table instance; and
    generating the data class in the object components to cache the retrieved persistent shared data, wherein the manager class reloads the persistent shared data from the shared table in the database to update the data class responsive to an update of the persistent shared data by an operator.

9. The method of claim 1, wherein the generating step comprises:
    responsive to detecting an object definition comprising an access element in an application definition, generating an access class in the object components to handle client side before and after logic, format a message from client parameters, send the message to a servlet class, received a message from the servlet class, and unformat the message;

generating a servlet class in the object components to demarshal the message into server parameters, invoke a service method on a local stateless session bean, marshal a message from server parameters, and send the marshaled message to the access class; and generating the local stateless session bean to handle server side before and after logic, invoke the service method on a service, and return a result to the servlet class.

10. The method of claim 1, wherein the generating step comprises:

responsive to detecting an object definition comprising a scope of exception in an application definition, generating an access class in the object components to retrieve a business delegate;

generating the business delegate in the object components, wherein the business delegate is used by a client to invoke a service method of a service represented by one of the service components;

generating a log class to log an exception when the exception is thrown by the service method; and returning the exception to a client, wherein the access class retries calling the service method when the exception is thrown by the service method.

11. The method of claim 1, further comprises;

responsive to detecting an object definition comprising a performance statistics element in an application definition, generating a command script to dispatch commands to a plurality of server instances;

responsive to detecting a request for a list of server properties, dispatching the commands to the plurality of server instances;

collecting results from the plurality of server instances; and aggregating the results and returning to the operator.

12. The method of claim 1, further comprises:

responsive to detecting an object definition comprising a command element in an application definition, generating a command client to invoke a command received from a command script and delegate the command to a command facade; and generating the command facade to invoke an mbean on each server to retrieve server properties of each server and return status of each command from each server to the command client.

13. The method of claim 1, further comprises:

responsive to detecting an object definition comprising a scope of startup in an application definition, generating a startup bean to invoke an initialize method to launch each component in the set of code components in order, and invoke a terminal method to shutdown each component in order.

14. The method of claim 1, wherein the generating step comprises:

responsive to detecting a definition of a scope of exception in an application definition, generating an access class in the object components to retrieve a business delegate;

generating the business delegate in the object components, wherein the business delegate is used by a client to invoke a service method of a service represented by one of the service component; and generating an application facade in the object components to handle server side before and after logic as defined in the application definition, wherein the access class retries to invoke a service method when an exception is thrown by the service method and returns an unchecked exception to a client.

15. The method of claim 14, wherein the client provides user code to pack the unchecked exception in a checked exception, throw the checked exception to the service, unpack the unchecked exception from the checked exception, throw the unchecked exception to the application facade, and catch the unchecked exception via the application facade and the business delegate.

16. A data processing system comprising:

a client tier comprising at least one client channel;

a server tier comprising an application server and a database, wherein the at least one client channel directly access the server tier or indirectly access the server tier via at least one of an access hub and a legacy system gateway, wherein the application server comprises:

a system library comprising a set of components for the service frameworks, wherein the set of components includes object components and service components based on a set of platform independent models;

a set of platform independent models, wherein a subset of components embodied in a plurality of application definitions is identified from the set of components by an integrated generator;

a target platform for identifying the service frameworks;

an integrated generator for generating the service frameworks, wherein the service frameworks are deliverable to a client, wherein the service frameworks include a computer usable program code for the service frameworks, wherein the computer usable program code includes the object components and the service components, wherein the service frameworks include typed components, and wherein the typed components are weakly typed components or strongly typed components, and wherein the integrated generator generates the set of code components includes;

generating an access class in the object components to retrieve a manager class responsive to detecting an object definition comprising a scope of server in an application definition;

generating the manager class in the object components to retrieve server properties from a data class; and generating the data class in the object components to read server properties from a property file and cache the server properties at a server start up, wherein the data class includes get methods for accessing property values of the server properties, and wherein the data class includes a reload method to reload server properties from the property file if the property file is updated without a server restart; and a storage for the service frameworks on the data processing system, wherein the service frameworks are platform dependent.

17. The data processing system of claim 16, wherein the integrated generator generates the set of code components includes:

generating an access class in the object components to retrieve a business delegate responsive to detecting a definition of a service in an application definition;

generating the business delegate in the object components, wherein the business delegate is used by a client to invoke a service method of a service represented by one of the service components, generating an application facade in the object components to handle server side before and after logic as defined in the application definition; and generating an application context for storing parameters and return values for business transactions between the client and the service responsive to detecting an object definition comprising a scope of application.

18. The data processing system of claim 16, wherein the integrated generator generates the set of code components includes:
  generating an access class in the object components to retrieve a manager class responsive to detecting an object definition comprising a scope of request in an application definition;
  generating the manager class in the object components to retrieve shared data from a data class, wherein the manager class retrieves the shared data from a work area if the shared data is absent in the data class, and wherein the shared data is transient data shared between the business delegate and the application facade; and
  generating the data class in the object components to cache the shared data and hold transaction statistics data.

19. The data processing system of claim 16, wherein the integrated generator generates the set of code components includes:
  generating an access class in the object components to retrieve a manager class responsive to detecting an object definition comprising a scope of cell in an application definition;
  generating the manager class in the object components to retrieve persistent shared data from a data class;
  generating a container managed persistent bean in the object components to retrieve the persistent shared data from a shared table in a database via a shared table instance; and
  generating the data class in me object components to cache the retrieved persistent shared data, wherein the manager class reloads the persistent shared data from the shared table in the database to update the data class responsive to an update of the persistent shared data by an operator.

20. The data processing system of claim 16, wherein the integrated generator generates the set of code components includes:
  generating an access class in the object components to handle client side before and after logic, format a message from client parameters, send the message to a servlet class, received a message from the servlet class, and unformat the message responsive to detecting an object definition comprising an access element in an application definition;
  generating a servlet class in the object components to demarshal the message into server parameters, invoke a service method on a local stateless session bean, marshal a message from server parameters, and send the marshaled message to the access class; and
  generating the local stateless session bean to handle server side before and after logic, invoke the service method on a service, and return a result to the servlet class.

21. The data processing system of claim 16, wherein the integrated generator generates the set of code components includes:
  generating an access class in the object components to retrieve a business delegate responsive to detecting an object definition comprising a scope of exception in an application definition;
  generating the business delegate in the object components, wherein the business delegate is used by a client to invoke a service method of a service represented by one of the service components;
  generating a log class to log an exception when the exception is thrown by the service method; and
  returning the exception to a client, wherein the access class retries calling the service method when the exception is thrown by the service method.

22. The data processing system of claim 16, wherein the integrated generator further generates a command script to dispatch commands to a plurality of server instances responsive to detecting an object definition comprising a performance statistics element in an application definition, and wherein the data processing system further comprises:
  a command script for dispatching the commands to the plurality of server instances responsive to detecting a request for a list of server properties, collects results from the plurality of server instances, and aggregates the results and returning to the operator.

23. The data processing system of claim 16, wherein the integrated generator further generates a command client to invoke a command received from a command script and delegate the command to a command facade responsive to detecting an object definition comprising a command element in an application definition; and generates the command facade to invoke art mbean on each server to retrieve server properties of each server and return status of each command from each server to the command client.

24. The data processing system of claim 16, wherein the integrated generator further generates a startup bean to invoke an initialize method to launch each component in the set of code components in order, and invoice a terminal method to shutdown each component in order responsive to detecting an object definition comprising a scope of startup in an application definition.

25. The data processing system of claim 16, wherein the integrated generator generates the set of code components includes:
  responsive to detecting a definition of a scope of exception in an application definition, generating an access class in the object components to retrieve a business delegate;
  generating the business delegate in the object components, wherein the business delegate is used by a client to invoke a service method of a service represented by one of the service component; and
  generating an application facade in the object components to handle server side before and after logic as defined in the application definition, wherein the access class retries to invoice a service method when an exception is thrown by the service method and returns an unchecked exception to a client.

26. A computer program product comprising:
  a computer usable storage medium having computer usable program code for generating service frameworks, the computer program product including:
  computer usable program code for providing a system library comprising a set of components for the service frameworks, wherein the set of components includes object components and service components based on a set of platform independent models;
  computer usable program code for identifying a subset of components from the set of components by an integrated generator;
  computer usable program code for identifying a target platform for the service frameworks;
  computer usable program code for generating the service frameworks by an integrated generator, wherein the service frameworks are deliverable to a client, wherein the service frameworks include a computer usable program code for the service frameworks, wherein the computer usable program code includes the object components and the service components, wherein the service frameworks include typed components, and wherein the typed components are weakly typed components or strongly typed components, and wherein the computer usable program code for generating a set of code components for a service framework using the subset of components further comprises:

computer usage program code for generating an access class in the object components to retrieve a manager class responsive to detecting an object definition comprising a scope of server in an application definition;

computer usage program code for generating the manager class in the object components to retrieve server properties from a data class; and computer usage program code for generating the data class in the object components to read server properties from a property file and cache the server properties at a server startup, wherein the data class includes get methods the accessing property values of the server properties, and wherein the data class includes a reload method to reload server properties from the property file if the property file is undated without a server restart; and computer usable program code for storing the service frameworks on the data processing system, wherein the service frameworks are platform dependent.

27. The computer program product of claim 26, wherein the computer usable program code for generating a set of code components for a service framework using the subset of components further comprises:

computer usage program code for generating an access class in the object components to retrieve a business delegate responsive to detecting a definition of a service in an application definition;

computer usage program code for generating the business delegate in the object components, wherein the business delegate is used by a client to invoice a service method of a service represented by one of the service components, computer usage program code for generating an application facade in the object components to handle server side before and after logic as defined in the application definition; and computer usage program code for generating an application context for storing parameters and return values for business transactions between the client and the service responsive to detecting an object definition comprising a scope of application.

28. The computer program product of claim 26, wherein the computer usable program code for generating a set of code components for a service framework using the subset of components further comprises:

computer usage program code for generating an access class in the object components to retrieve a manager class responsive to detecting an object definition comprising a scope of request in an application definition;

computer usage program code for generating the manager class in the object components to retrieve shared data from a data class, wherein the manager class retrieves the shared data from a work area if the shared data is absent in the data class, and wherein the shared data is transient data shared between the business delegate and the application facade; and computer usage program code for generating the data class in the object components to cache the shared data and hold transaction statistics data.

29. The computer program product of claim 26, wherein the computer usable program code for generating a set of code components for a service framework using the subset of components further comprises:

computer usage program code for generating an access class in the object components to retrieve a manager class responsive to detecting an object definition comprising a scope of cell in an application definition;

computer usage program code for generating the manager class in the object components to retrieve persistent shared data from a data class;

computer usage program code for generating a container managed persistent bean in the object components to retrieve the persistent shared data from a shared table in a database via a shared table instance; and computer usage program code for generating the data class in the object components to cache the retrieved persistent shared data, wherein the manager class reloads the persistent shared data from the shared table in the database to update the data class responsive to an update of the persistent shared data by an operator.

30. The computer program product of claim 26, wherein the computer usable program code for generating a set of code components for a service framework using the subset of components further comprises:

computer usage program code for generating an access class in the object components to handle client side before and after logic, format a message from client parameters, send the message to a servlet class, received a message from the servlet class, and unformat the message responsive to detecting an object definition comprising an access element in an application definition;

computer usage program code for generating a servlet class in the object components to demarshal the message into server parameters, invoke a service method on a local stateless session bean, marshal a message from server parameters, and send the marshaled message to the access class; and computer usage program code for generating the local stateless session bean to handle server side before and after logic, invoke the service method on a service, and return a result to the servlet class.

31. The computer program product of claim 26, wherein the computer usable program code for generating a set of code components for a service framework using the subset of components further comprises:

computer usage program code for generating an access class in the object components to retrieve a business delegate responsive to detecting an object definition comprising a scope of exception in an application definition;

computer usage program code for generating the business delegate in the object components, wherein the business delegate is used by a client to invoke a service method of a service represented by one of the service components;

computer usage program code for generating a log class to log an exception when the exception is thrown by the service method; and computer usage program code for returning the exception to a client, wherein the access class retries calling the service method when the exception is thrown by the service method.

32. The computer program product of claim 26, wherein the computer program product further includes:

computer usable program code for generating a command script to dispatch commands to a plurality of server instances responsive to detecting an object definition comprising a performance statistics element in an application definition;

computer usable program code for dispatching the commands to the plurality of server instances responsive to detecting a request for a list of server properties;

computer usable program code for collecting results from the plurality of server instances; and computer usable program code for aggregating the results and returning to the operator.

33. The computer program product of claim 26, wherein the computer program product further includes:

computer usable program code for generating a command client to invoke a command received from a command script and delegate the command to a command facade responsive to detecting an object definition comprising a command clement in an application definition; and computer usable program code for generating the command facade to invoke an mbean on each server to retrieve server properties of each server and return status of each command from each server to the command client.

34. The computer program product of claim 26, wherein the computer program product further includes:

computer usable program code for generating a startup bean to invoke an initialize method to launch each component in the set of code components in order, and invoke a terminal method to shutdown each component in order responsive to detecting an object definition comprising a scope of startup in an application definition.

35. The computer program product of claim 26, wherein the computer program product further includes:

computer usable program code for generating an access class in the object components to retrieve a business delegate responsive to detecting a definition of a scope of exception in an application definition;

computer usable program code for generating the business delegate in the object components, wherein the business delegate is used by a client to invoke a service method of a service represented by one of the service component; and computer usable program code for generating an application facade in the object components to handle server side before and after logic as defined in the application definition, wherein the access class retries to invoke a service method when an exception is thrown by the service method and returns an unchecked exception to a client.

* * * * *

UNITED STATES PATENT AND TRADEMARK OFFICE
CERTIFICATE OF CORRECTION

PATENT NO. : 7,617,479 B2 Page 1 of 1
APPLICATION NO. : 11/168789
DATED : November 10, 2009
INVENTOR(S) : Hambrick et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1170 days.

Signed and Sealed this

Nineteenth Day of October, 2010

David J. Kappos
*Director of the United States Patent and Trademark Office*